United States Patent
Muhs et al.

(10) Patent No.: US 6,459,050 B1
(45) Date of Patent: Oct. 1, 2002

(54) METHOD AND APPARTUS FOR CONVERTING STATIC IN-GROUND VEHICLE SCALES INTO WEIGH-IN-MOTION SYSTEMS

(75) Inventors: Jeffrey D. Muhs, Lenior City; Matthew B. Scudiere, Oak Ridge; John K. Jordan, Oak Ridge, all of TN (US)

(73) Assignee: UT-Battelle, Inc., Oak Ridge, TN (US)

( * ) Notice: Subject to any disclaimer, the term of this patent is extended or adjusted under 35 U.S.C. 154(b) by 0 days.

(21) Appl. No.: 09/398,883

(22) Filed: Sep. 20, 1999

(51) Int. Cl.7 .............................................. G10G 19/03
(52) U.S. Cl. ........................ 177/133; 702/101; 702/175
(58) Field of Search ............................... 177/132, 133, 177/134, 135; 702/101, 102, 173, 174, 175; 73/1.13

(56) References Cited

U.S. PATENT DOCUMENTS

| | | | |
|---|---|---|---|
| 3,835,945 A | | 9/1974 | Yamanaka et al. .......... 177/134 |
| 4,049,069 A | | 9/1977 | Tamamura et al. ......... 177/134 |
| 4,539,650 A | | 9/1985 | Griffin et al. ............... 177/136 |
| 4,691,290 A | | 9/1987 | Griffen ....................... 364/567 |
| 4,815,547 A | * | 3/1989 | Dillon et al. ................. 73/1.13 |
| 5,002,141 A | | 3/1991 | Loshbough et al. ... 177/210 FP |
| 5,111,897 A | * | 5/1992 | Snyder et al. ............... 177/132 |
| 5,260,520 A | | 11/1993 | Muhs et al. ............ 177/210 R |
| 5,585,604 A | | 12/1996 | Holm ......................... 177/133 |
| 5,621,195 A | * | 4/1997 | Taylor et al. ............... 177/133 |
| 5,773,766 A | * | 6/1998 | Kinoshita et al. ........ 177/25.13 |
| 5,959,259 A | * | 9/1999 | Beshears et al. ............ 177/132 |
| 5,998,741 A | * | 12/1999 | Beshears et al. ............ 177/133 |

FOREIGN PATENT DOCUMENTS

WO WO 98/40705 9/1998

OTHER PUBLICATIONS

Rudolf F. Graf, ed. "Modern Dictionary of Electronics, Sixth Edition" Butterworth–Heinemann, Woburn, MA, p.509 copyright 1999.*
Franklin, G.F. et al.,*Feedback Control of Dynamic System*, Addison–Wesley Publishing Company, Reading, Mass., pp. 49–58, 540–547 (1986).
Glisson, T.H., *Introduction to System Analysis*, McGraw–Hill Book Company, New York, pp. 59–62, 109–127 (1985).

* cited by examiner

*Primary Examiner*—Randy W. Gibson
(74) *Attorney, Agent, or Firm*—Kilpatrick Stockton LLP

(57) ABSTRACT

An apparatus and method for converting in-ground static weighing scales for vehicles to weigh-in-motion systems. The apparatus upon conversion includes the existing in-ground static scale, peripheral switches and an electronic module for automatic computation of the weight. By monitoring the velocity, tire position, axle spacing, and real time output from existing static scales as a vehicle drives over the scales, the system determines when an axle of a vehicle is on the scale at a given time, monitors the combined weight output from any given axle combination on the scale(s) at any given time, and from these measurements automatically computes the weight of each individual axle and gross vehicle weight by an integration, integration approximation, and/or signal averaging technique.

27 Claims, 24 Drawing Sheets

Typical WIM output waveform from the static scale for an eighteen wheeled 5 axle tractor-trailer Typical WIM output waveform from the static scale for a dual axle vehicle Absolute error versus static weight (on a per axle basis)

Absolute error versus static weight (on a per vehicle basis)

% Error versus static weight (on a per vehicle basis)

ALTERNATE EMBODIMENT 100

RESPONSE AS A FUNCTION OF POSITION IN DIRECTION OF TRAVEL

Fig. 13
13000
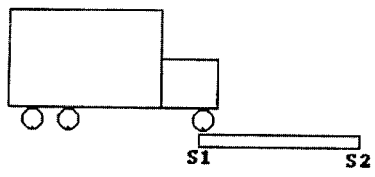
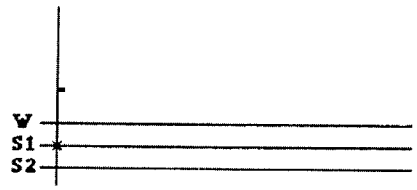
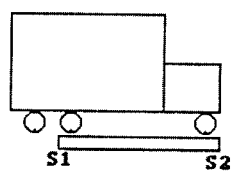
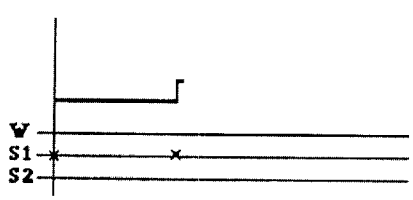
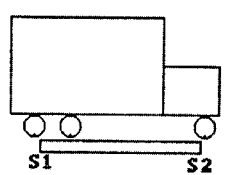
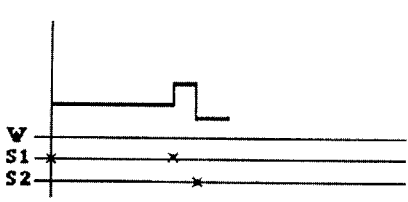
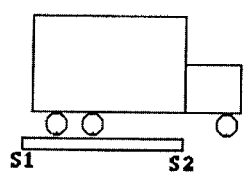
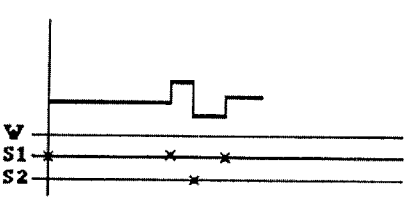
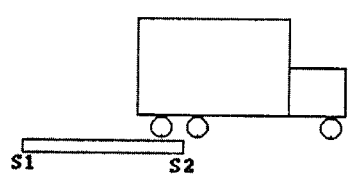
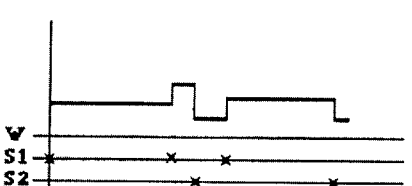
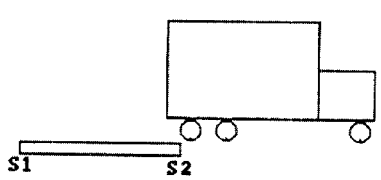
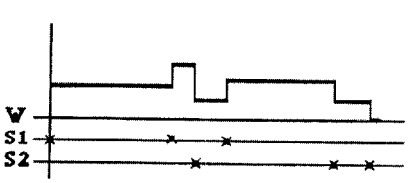

Fig. 23 Velocity over time v(t)
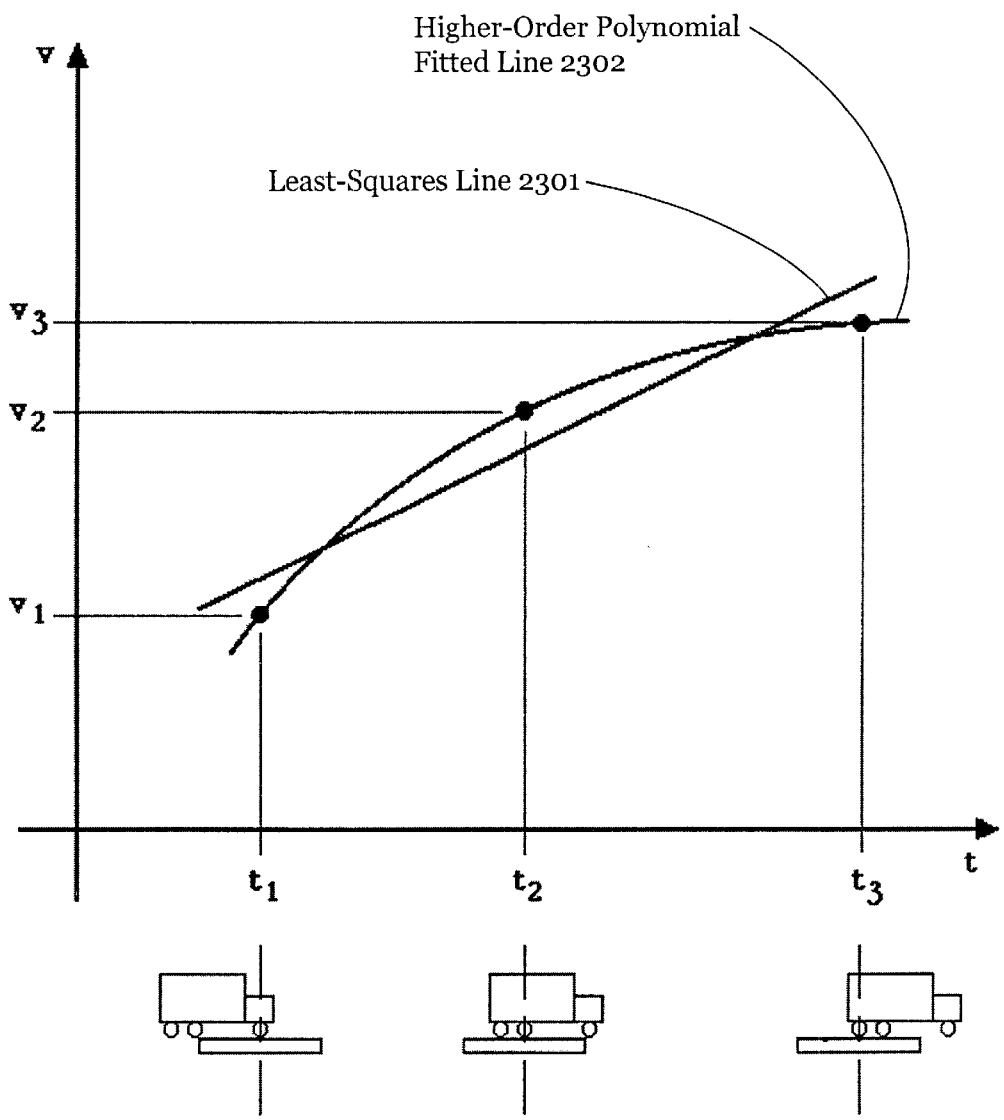
$V_1$ = First axle instantaneous velocity at time $t_1$
$V_2$ = Second axle instantaneous velocity at time $t_2$
$V_3$ = Third axle instantaneous velocity at time $t_3$

FIG. 24

Table I – Static Scale Conversion to WIM System Results on a per axle(s) set basis Tractor Front Axle

| Vehicle Number | Static Weight (lbs.) | WIM Weight (lbs.) | Error (lbs.) | Percent Error |
|---|---|---|---|---|
| 1 | 11,310 | 11,400 | 90 | 0.79 |
| 2 | 9,860 | 9,869 | 9 | 0.09 |
| 3 | 10,520 | 10,324 | -196 | -1.87 |
| 4 | 11,780 | 11,716 | -64 | -0.54 |
| 5 | 8,880 | 8,893 | 13 | 0.14 |
| 6 | 10,980 | 10,993 | 13 | 0.12 |
| 7 | 10,680 | 10,513 | -167 | -1.56 |
| 8 | 10,840 | 10,888 | 48 | 0.44 |
| 9 | 10,160 | 10,066 | -94 | -0.93 |
| 10 | 7,540 | 7,567 | 27 | 0.35 |
| 11 | 10,680 | 10,722 | 42 | 0.39 |
| 12 | 8,500 | 8,190 | -310 | -3.64 |
| 13 | 11,320 | 11,306 | -14 | -0.13 |
| 14 | 13,760 | 13,774 | 14 | 0.10 |

Tractor Rear Axle(s)

| Vehicle Number | Static Weight (lbs.) | WIM Weight (lbs.) | Error (lbs.) | Percent Error |
|---|---|---|---|---|
| 1 | 12,840 | 12,782 | -58 | -0.45 |
| 2 | 12,640 | 12,838 | 198 | 1.57 |
| 3 | 13,600 | 13,889 | 289 | 2.13 |
| 6 | 13,080 | 13,026 | -54 | -0.41 |
| 8 | 18,880 | 18,792 | -88 | -0.47 |
| 10 | 9,420 | 9,452 | 32 | 0.34 |
| 11 | 22,820 | 22,669 | -151 | -0.66 |
| 12 | 21,800 | 21,882 | 82 | 0.38 |

Trailing Axle(s)

| Vehicle Number | Static Weight (lbs.) | WIM Weight (lbs.) | Error (lbs.) | Percent Error |
|---|---|---|---|---|
| 2 | 10,120 | 10,122 | 2 | 0.02 |
| 3 | 12,560 | 12,305 | -255 | -2.03 |
| 6 | 11,040 | 11,142 | 102 | 0.92 |
| 8 | 14,620 | 14,800 | 180 | 1.23 |
| 12 | 15,680 | 15,781 | 101 | 0.64 |
| 13 | 21,920 | 22,131 | 211 | 0.96 |

Standard Deviation – 1.2% on a per axle basis considering all 28 axles

Fig. 25

Table II - Static Scale Conversion to WIM System results on a per vehicle basis

| Vehicle Number | Static Weight (lbs.) | WIM Weight (lbs.) | Error (lbs.) | Percent Error |
|---|---|---|---|---|
| 1 | 24,150 | 24,182 | 32 | 0.13 |
| 2 | 32,620 | 32,829 | 209 | 0.64 |
| 3 | 36,668 | 36,518 | -162 | -0.44 |
| 6 | 35,900 | 35,884 | -16 | -0.04 |
| 8 | 42,380 | 42,484 | 104 | 0.25 |
| 12 | 45,980 | 45,853 | -127 | -0.28 |

Standard Deviation – 0.39% on a per vehicle basis

US 6,459,050 B1

METHOD AND APPARTUS FOR CONVERTING STATIC IN-GROUND VEHICLE SCALES INTO WEIGH-IN-MOTION SYSTEMS

GOVERNMENT LICENSE RIGHTS

This invention was made with Government support under Contract No. DE-AC05-96OR22464 awarded by the U.S. Department of Energy to Lockheed Martin Energy Research Corp., and the Government has certain rights in this invention.

TECHNICAL FIELD

The present invention generally relates to vehicle weigh-in-motion scales, for example, at-speed scales used in highways (65 mph) and ramp scales (15 mph). But more particularly, the invention applies to the conversion of existing static scales that are designed for weight measurement carried out with the truck at a complete stop.

BACKGROUND OF THE INVENTION

Because of the increased number of vehicles on the nation highways, considerable effort has been made by the federal and state transportation agencies and motor carriers to increase the efficiency of enforcement operations at the highway weigh-stations. For example, operational tests and regional deployments such as Advantage I-75, HELP/Cresent, Prepass and CVISN are making great strides towards improving the productivity of both enforcement officers and motor carriers at weigh stations. One of the significant technical advances that have helped lead to these improvements is the development of weigh-in-motion systems. In conjunction with other technologies, weigh-in-motion systems are used to screen out overweight commercial vehicles approaching the weigh stations. Unfortunately, a large majority of carriers are not participating in the programs such as Advantage I-75 and are still required to stop at the weigh-stations. Furthermore, although existing commercially available WIM systems can be use as screening devices they do not provide the accuracy required (<1%) for final certification and ticketing of overweight vehicles. There is considerable room for improvement in accuracy and variability in the commercial WIM systems.

At best, weight enforcement activities are slow and cumbersome causing substantial overcrowding at weigh stations. Law enforcement officials are forced to either create unsafe conditions by allowing vehicles to backup in long lines near the weigh station entrance ramps or allow carriers to bypass weigh stations completely. Each day several thousand carriers travel by various weigh stations. Approximately 70% of these vehicles bypass the weigh stations due to the overcrowded conditions. Traffic simulations of a low-speed WIM system indicate one can reduce the average delay for a motor carrier from 280 seconds to 40 seconds and eliminate vehicles bypassing the weigh station. The successful implementation of converting a static scale to a high-accuracy, low-speed weigh-in-motion system will allow weight enforcement officials to weigh all carriers thus increasing productivity and operational efficiency through increased throughput.

Conventional WIM systems used today are plagued with problems of accuracy. Mainline WIM systems have a typical accuracy error of greater than 5%. This fact limits their utility in enforcement and other applications because users often do not trust the measurements obtained.

Although the above prior art may include advantages, improvements in the art are always needed. Therefore it is an object of the present invention to provide a weigh-in-motion (WIM) method and apparatus which is more accurate than the prior art.

SUMMARY OF THE INVENTION

The present invention overcomes deficiencies in the art by providing an apparatus and method which has improved accuracy. The apparatus is uniquely adaptable for converting in-ground static weighing scales for vehicles to weigh-in-motion systems, while still allowing the static scales to be used in static determinations if required. The apparatus upon conversion includes the existing in-ground static scale, tire presence switches and an electronic module. The apparatus allows for determination of when an axle of a vehicle is on the scale(s) at a given time, monitors the combined weight output from any given axle or axle combination on the scale(s) at any given time, and from these measurements automatically computes the weight of each individual axle, gross vehicle weight, and other desirable values by an integration and or signal averaging technique.

Therefore it is an object of the present invention to provide a method and apparatus for accurately weighing vehicles.

It is a further object of the present invention to provide a method and apparatus for accurately weighing moving vehicles.

It is a further object of the present invention to provide a method and apparatus for reliably weighing moving vehicles.

It is a further object of the present invention to provide a method and apparatus for quickly weighing moving vehicles.

It is a further object of the present invention to provide a method and apparatus for safely weighing moving vehicles.

It is a further object of the present invention to provide a method and apparatus for accurately weighing moving vehicles which is readily adaptable to existing static weighing systems.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 10 shows a type of scale (such as a hydraulic scale) which yields the same response to weight being placed anywhere on the sensor surface. FIG. 10 shows a system 10,000, including a scale platform 10,005 and load cells 10,001. FIG. 11 shows a bending plate which uses strain gauges. With this FIG. 11 type of scale the sensitivity is not uniform over the scale from front to back but is uniform from left to right. FIG. 11 shows a system 11,000, including a scale platform 11,005, strain gauges 11,001, and knife edges 11,002.

FIG. 13 is a series 1300 of illustrative drawings and associated charts which show different steps of a multi-axled (in this case three axles) vehicle as it passes over a weight scale (which reads weight W thereon) having at one end a switch S1 and at its other end a switch S2. Each of the charts shows the weight value as a bold line above the vertical direction, and also shows switch events as discrete points on each of the switch event axes S1 and S2. The horizontal axis is time. The weight values of such charts are similar to those shown in, for example, FIGS. 2 and 3.

FIG. 23 is a two dimensional (velocity versus time) chart showing three points A, B, and C. Point A has coordinates $v_1, t_1$, point B has coordinates $v_2, t_2$, and point C has coordinates $V_3, t_3$, with $v_1$ being the velocity of a first axle at time $t_1$, $v_2$ being the velocity of a second axle at time $t_2$, and $v_3$ being the velocity of a third axle at time $t_3$. Line 2301 is provided by least squares fitting. Line 2302 is provided by a higher order polynomial fitting.

FIG. 24 is Table I.

FIG. 25 is Tale II.

DETAILED DESCRIPTION OF THE PREFERRED EMBODIMENT

Reference is now made to the drawings in which like numerals indicate like elements throughout the several views.

The Weighing Apparatus Generally

One purpose of the present invention is to demonstrate the feasibility of converting exiting in-ground static scales into a low-speed (~10 mph) weigh-in-motion system having accuracy errors approaching that of the same scale used statically (<1%). The main source of error in WIM systems is the vehicle dynamics. As the vehicle travels down the highway, its dynamic weight can vary as much as a 10% or more. Two frequency ranges (1–5 Hz and 9–14 Hz) are typically excited during vehicle motion. One source of excitation is associated with the vehicle dynamics and speed, which mostly excites the lower frequency range. The other source has to do with vehicle dimensions such as tire circumference which mostly excite the upper frequency range. In conventional high-speed WIM systems the vehicle passes at highway speeds over a sensor that is about two feet wide in the direction of travel. The width, speed combination translates into millisecond range signal duration. Unfortunately, a few milliseconds do not allow sufficient time to average the dynamic weight changes in the critical low frequency ranges. The present invention will take advantage of the length of the static scales and a lower speed range (~10 mph) to increase the sampling time and thus average the dynamic weight changes over time and thus reduce the variability created by the vehicle dynamic weight changes. The length of the scale and the speed obtains many cycles over which to average.

Figure 1:
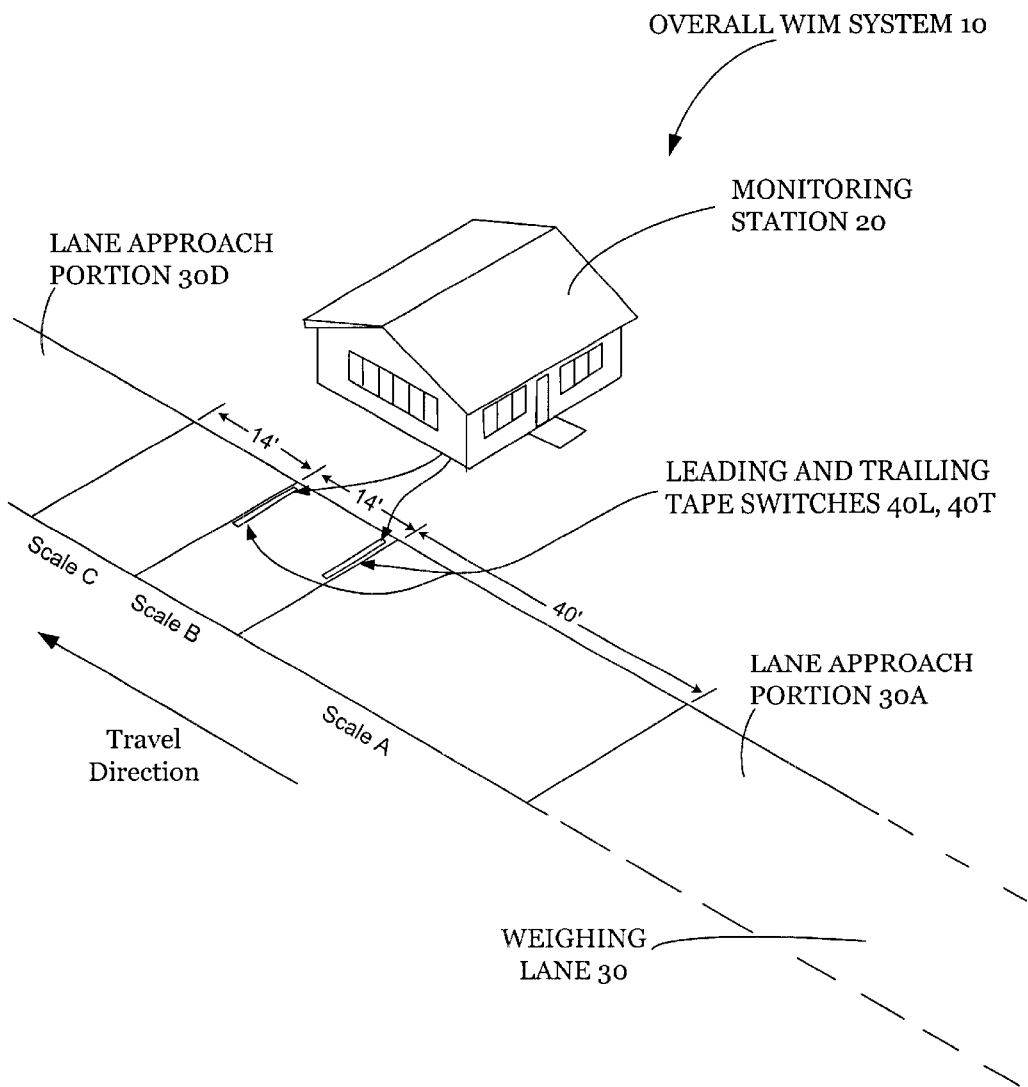
FIG. 1 is a pictorial view of a WIM apparatus 10 according to the present invention, which includes a monitoring station 20, a weighing lane 30, and tape switches 40 in the weighing lane 30. The weighing lane 30 includes an approach portion 30A and a departure portion 30D.

Reference is first made to FIG. 1, which is a pictorial view of a weighing apparatus according to one embodiment of the present invention. Generally described, the weighing apparatus 10 includes the following components:

a monitoring station 20
  a weighing lane 30
  tape switches 40

The monitoring station 20 includes a processing apparatus such as known in the art for providing the calculations set forth herein. Such a processing apparatus can be a computer as known in the art and is not part of the present invention.

The Calculations Generally

One feature of the process used here is such as that referenced in the low-speed WIM system discussed under patent Ser. No. 08,815,107, incorporated herein by reference. It is the mathematical representation of the actual physics of a tire rolling over a sensor, which is known in the art mathematically as a "convolution". However, in addition to this basic processing the present invention provides a lot of additional processing.

The processing according to the present invention also differs from earlier disclosures in the assumptions made to process the data. One particular assumption in other processes is that the velocity does not change while the tire is on the sensor. While constant velocity assumption is valid for very short scales, preliminary tests for long static scales indicate that it is almost impossible for a driver to maintain a constant speed while on the longer scales. For example, it is typical to see speed variations of more than two to one during the weighing process.

For short scales to measure the speed it is only necessary to have switches on the leading and trailing edges of the sensors. For long static scales it may be advantageous to have switches distributed over the scale, or other speed determining factors, to get multiple readings during the weighing process, to get an accurate velocity profile during the entire weighing process.

In the situation of the present invention of a few distributed switches over the surface of the scale for the tires to roll over, it is necessary to perform least squares fitting to obtain the exact profile and the distances between the axles. This can be accomplished by representing the speed as a third or fourth order polynomial and by correlating the contact closures in one overall least-squares fit.

However, if as contemplated under the present invention the switches are more numerous such as in a horizontal light curtain then determining the speed at every moment becomes more tractable with simpler approaches but one could still utilize the above fitting techniques for the greatest accuracy. Another type of speed sensor such as radar which does not necessarily track presence but instead tracks the speed and location of the overall vehicle could also be used in place of at least some of the switches, without departing from the present invention.

The overall system shown consists of a linear (or linearizable) weight transducer and multiple contact switches distributed over the length of the sensor. For this approach to perform properly the sensitivity of the weight transducer must be uniform from left to right but may vary linearly in any manner from front to back (direction of travel), since the tire may cross the transducer in any lateral position but will always traverse the sensor from front to back. In all static scales under consideration the sensitivity is carefully engineered to be uniform over the entire sensor area so this is not a consideration for this application.

Theory

Figure 9:
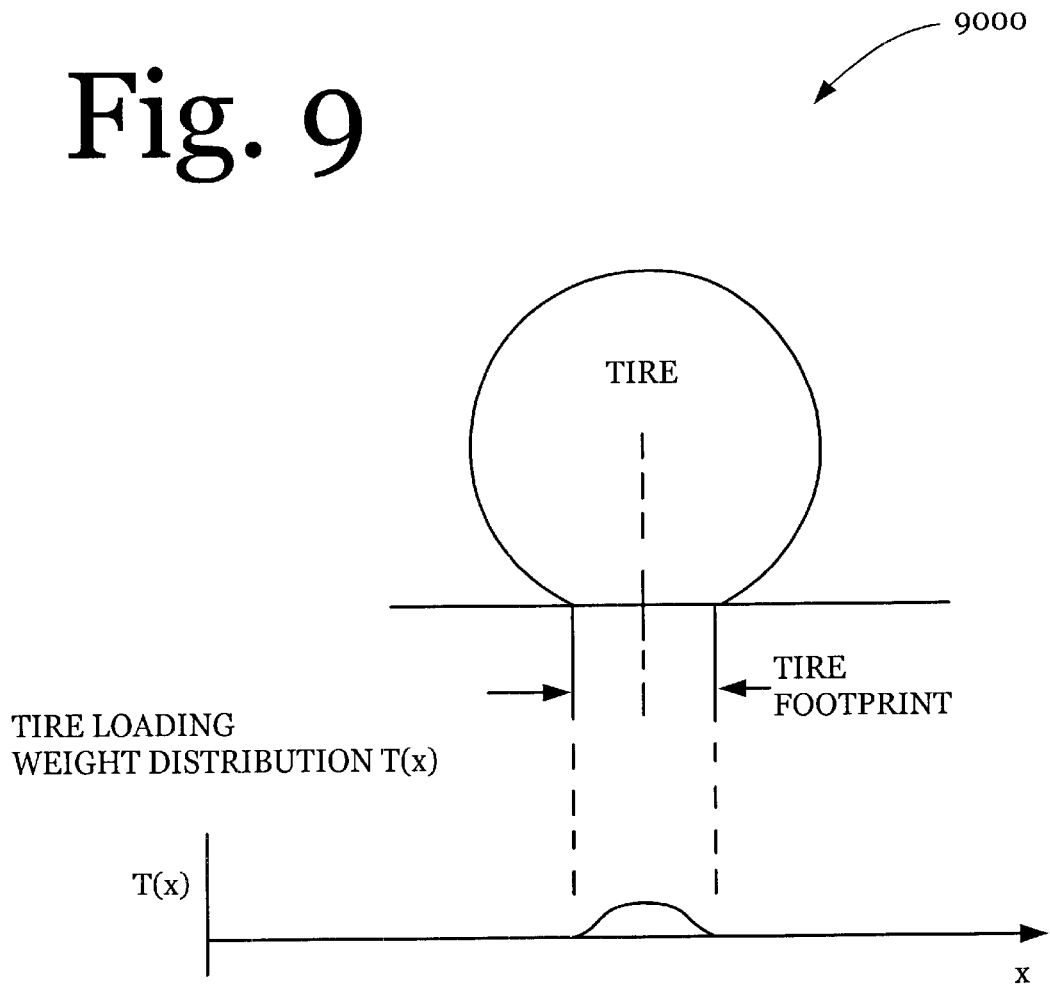
FIG. 9 generally shows tire pressure distribution on the ground or on a scale.
Figure 10:
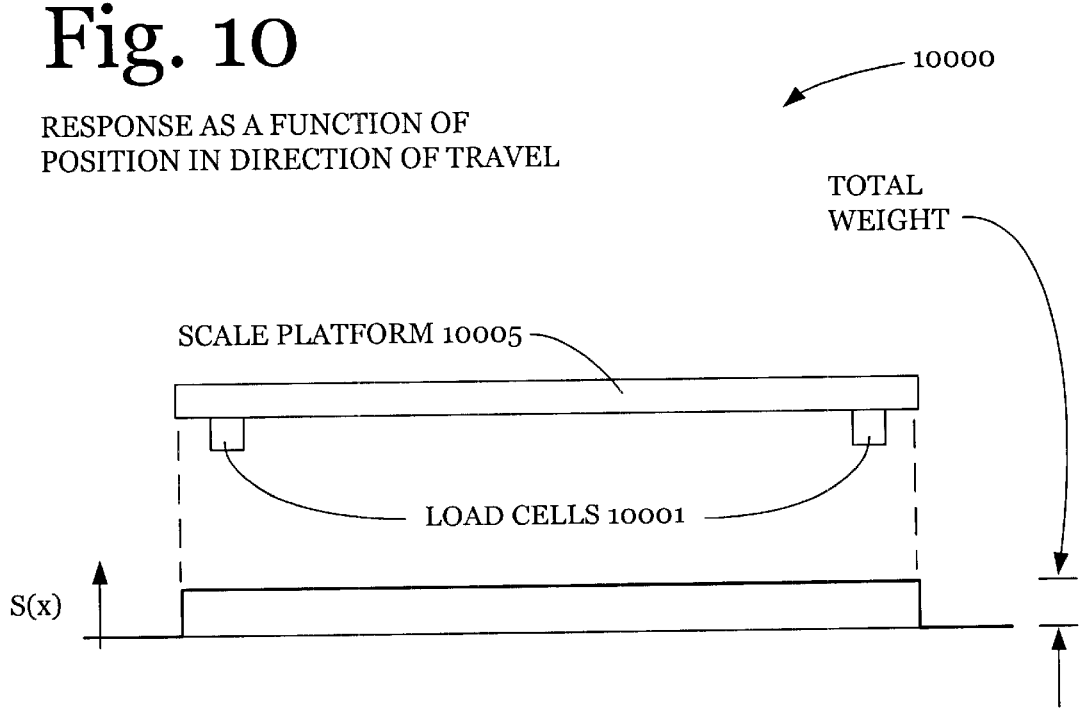
FIGS. 10 and 11 are side illustrative views of two types of scales according to the present invention.
Figure 11:
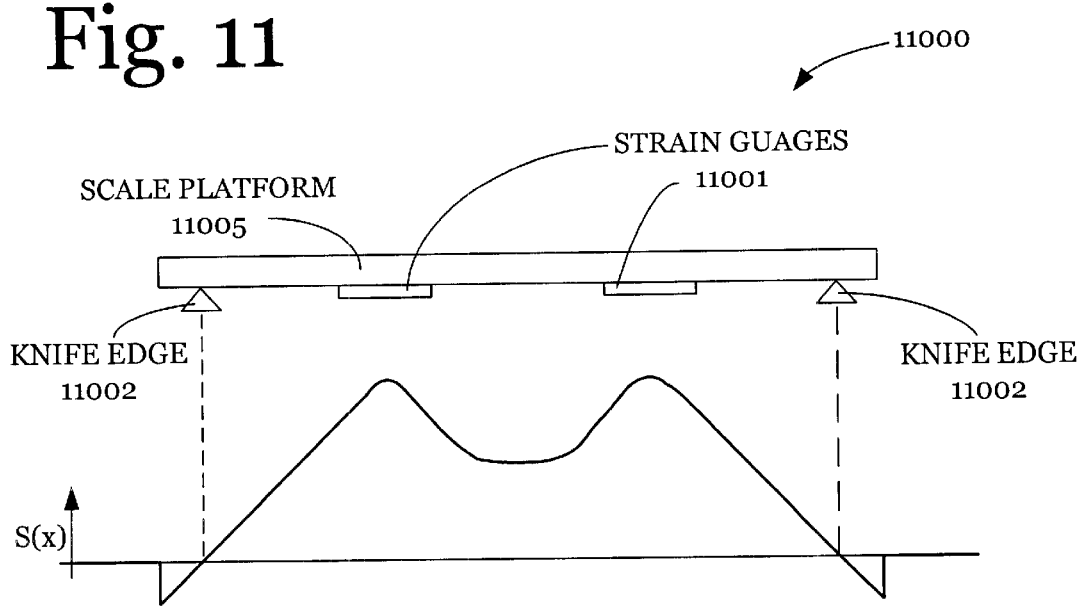
Figure 12:
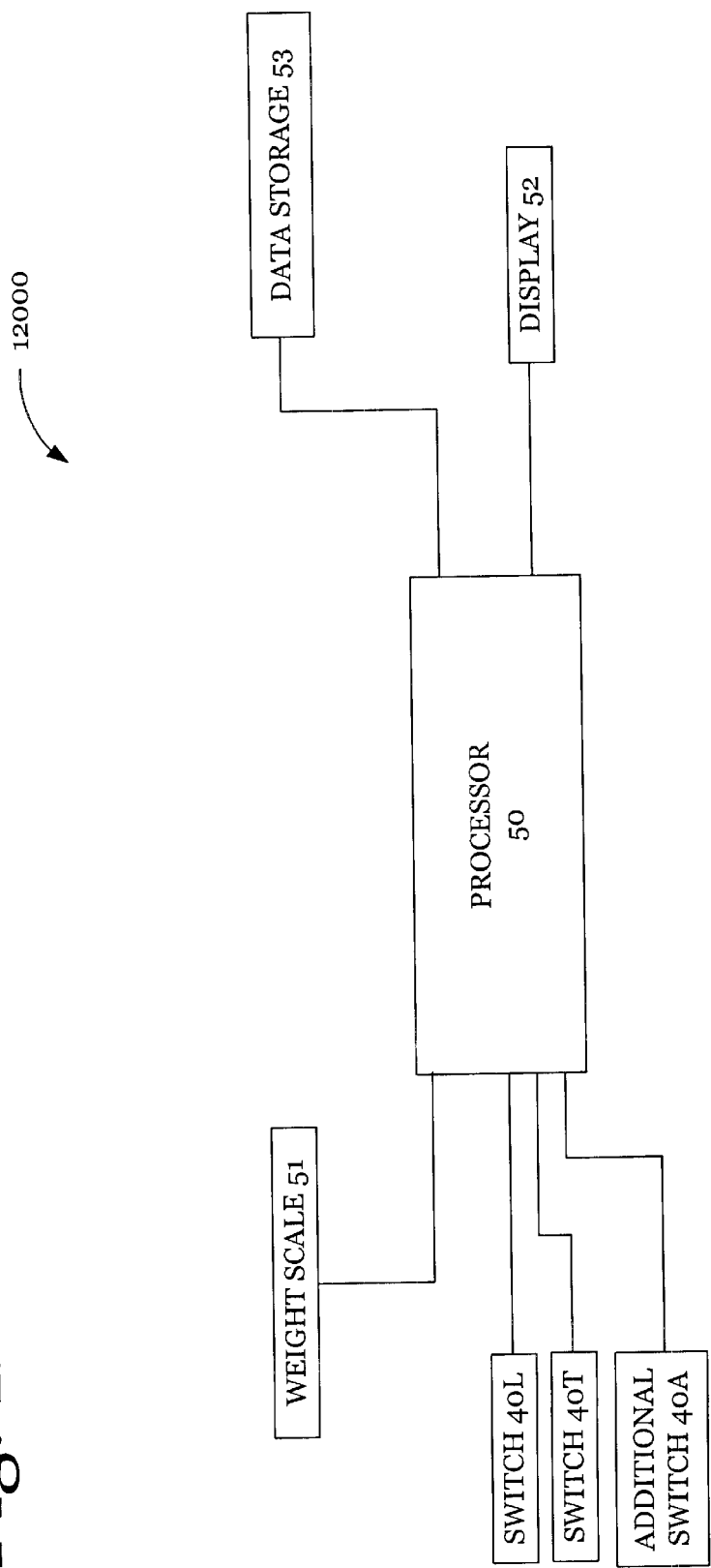
FIG. 12 is a block diagram 1200 showing the interaction between the data processor 50, a weight scale 51, the switches 40L, 40T, 40A, a visual display 52, and a data storage device 53. Other additional weight scales and sensors are not shown.
Figure 14:
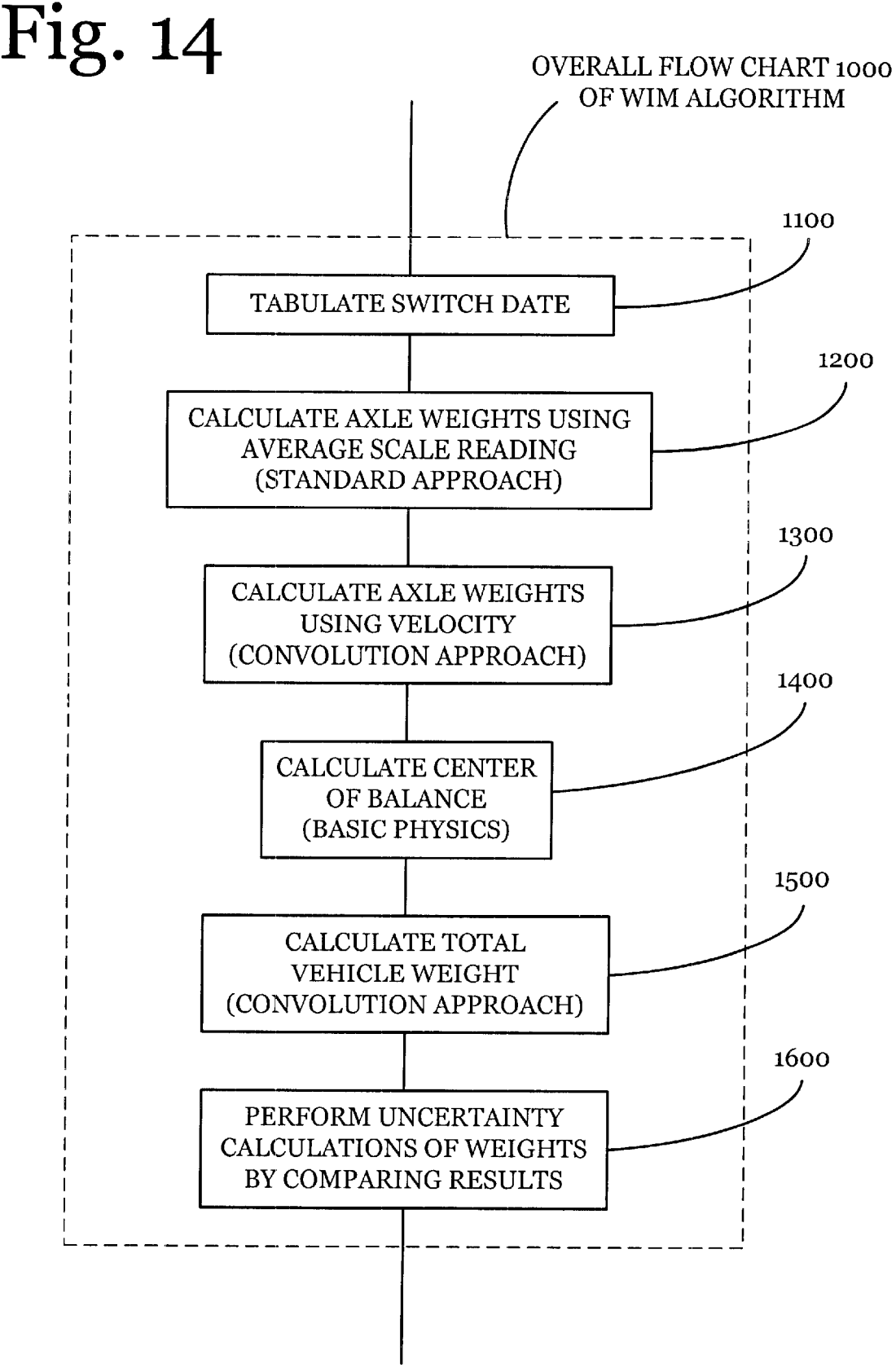
FIG. 14 is a flow chart 1000 showing one overall weigh-in-motion algorithm according to the present invention.
Figure 15:
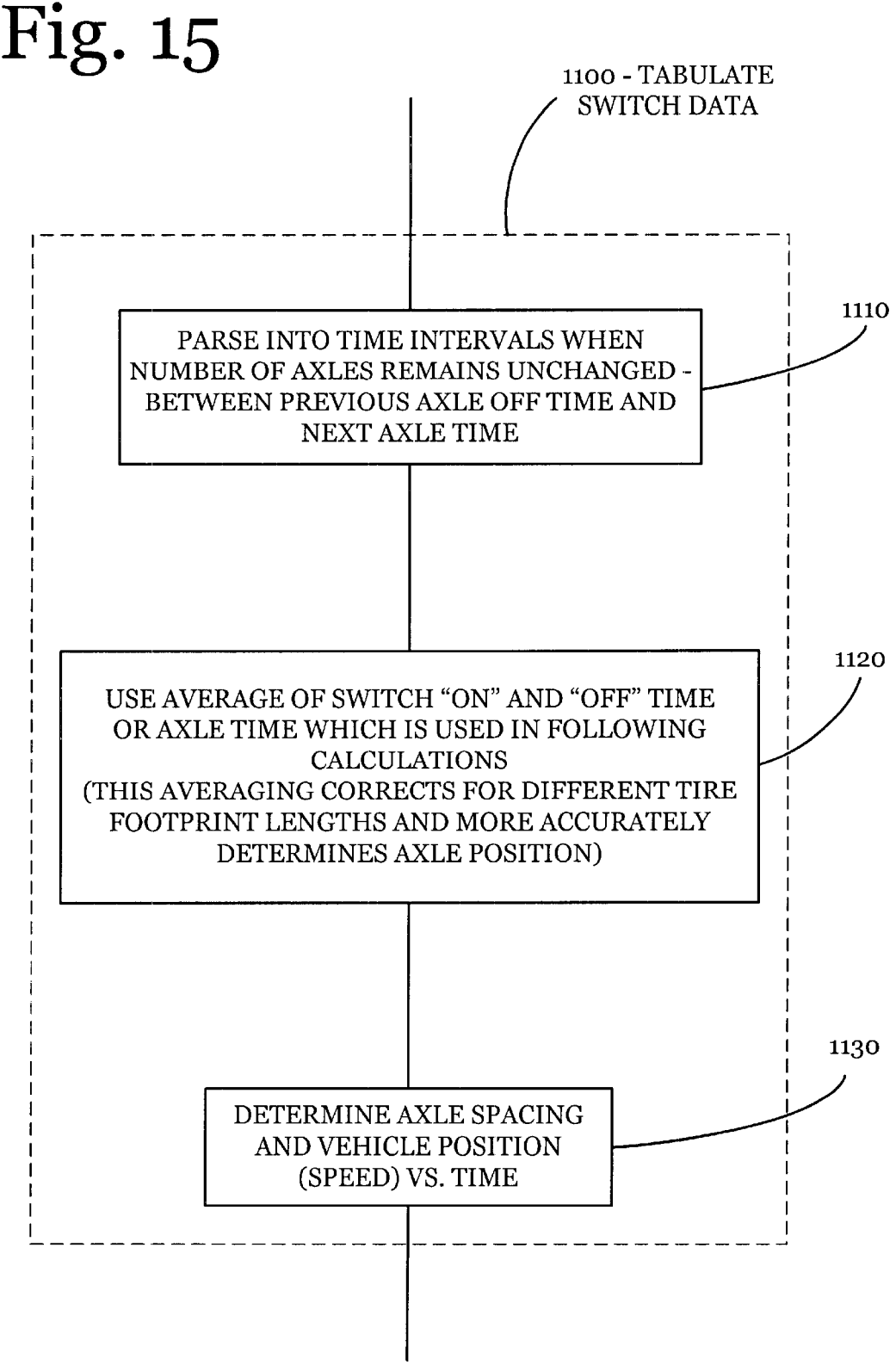
FIG. 15 is a flow chart 1100 showing substeps of step 1100 in FIG. 14, namely the tabulation of switch data.
Figure 16:
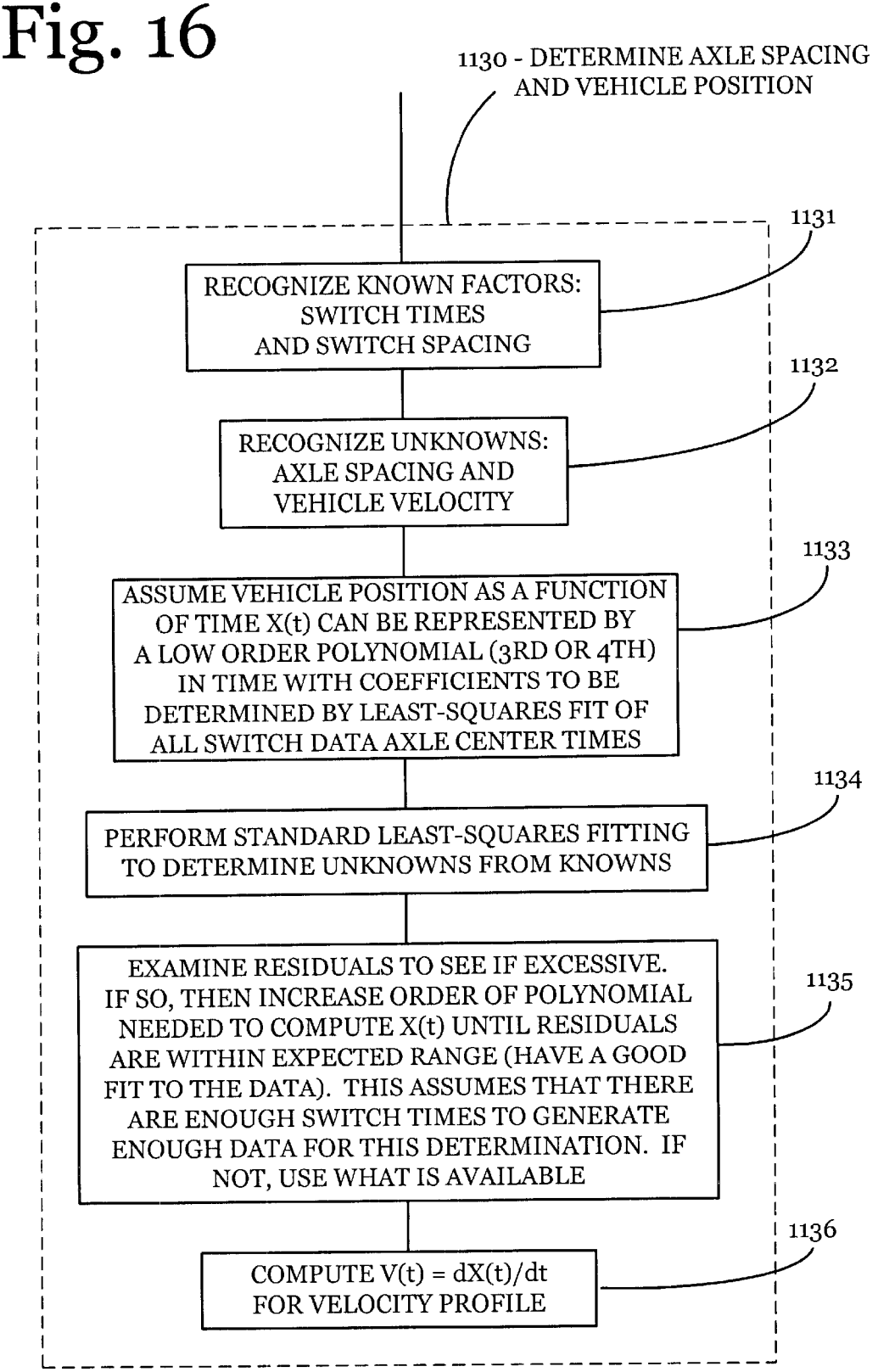
FIG. 16 is a flow chart 1130 showing substeps of step 1300 in FIG. 14, namely the determination of axle spacing and vehicle position.
Figure 17:
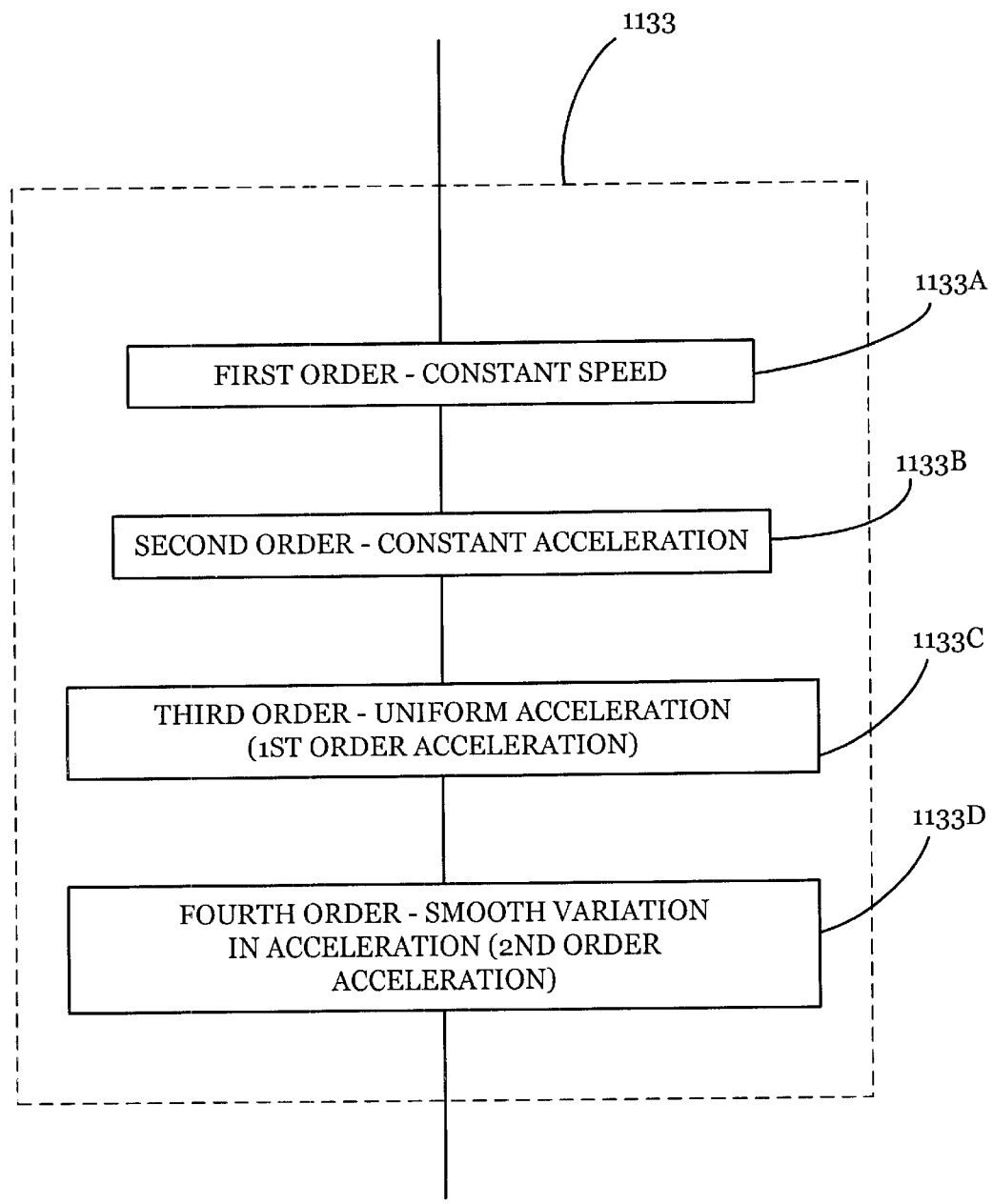
FIG. 17 is a flow chart 1133 showing substeps of step 1133 in FIG. 16.
Figure 18:
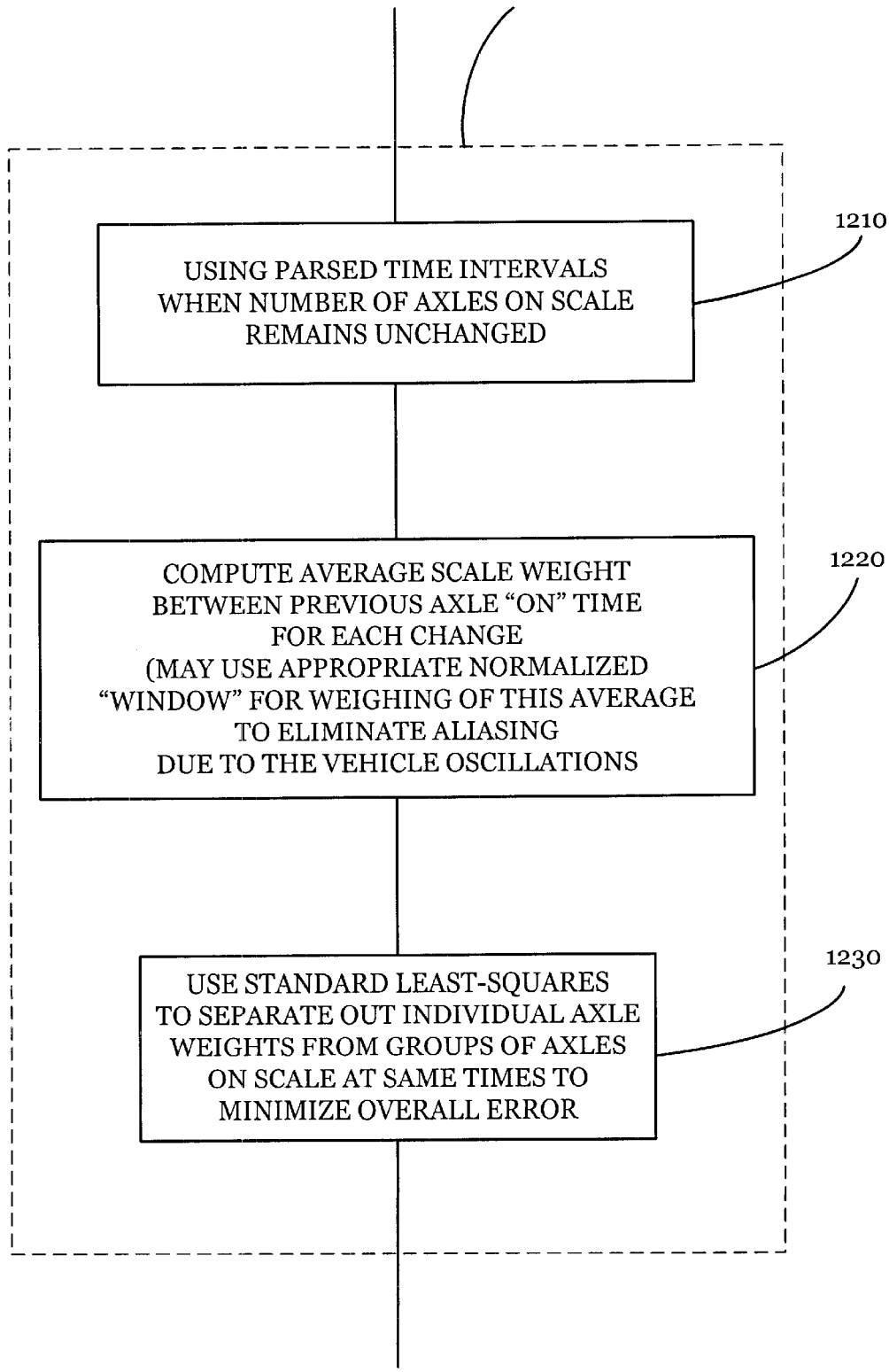
FIG. 18 is a flow chart 1200 showing substeps of step 1200 in FIG. 14.
Figure 19:
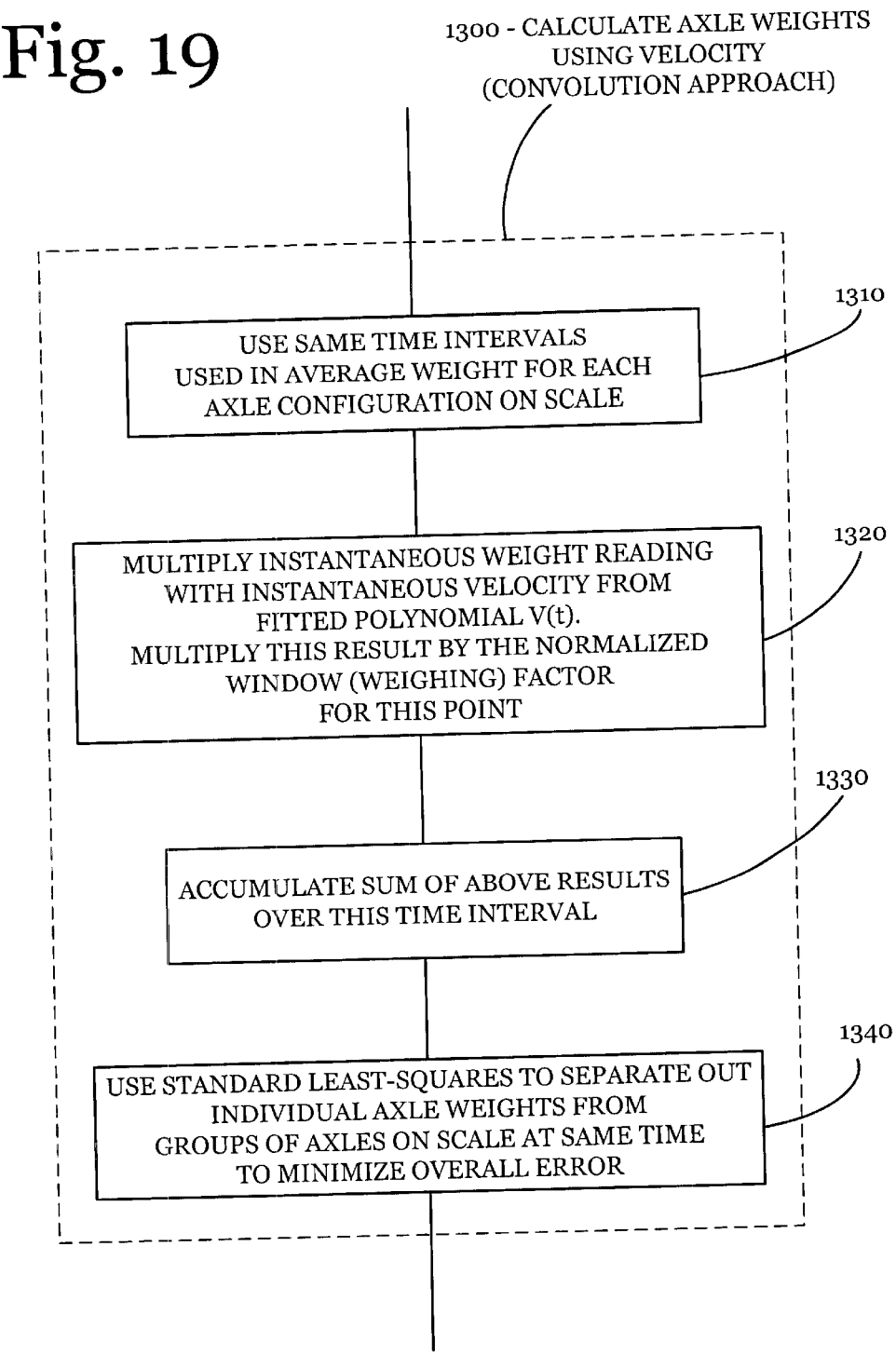
FIG. 19 is a flow chart 1300 showing substeps of step 1300 in FIG. 14.
Figure 20:
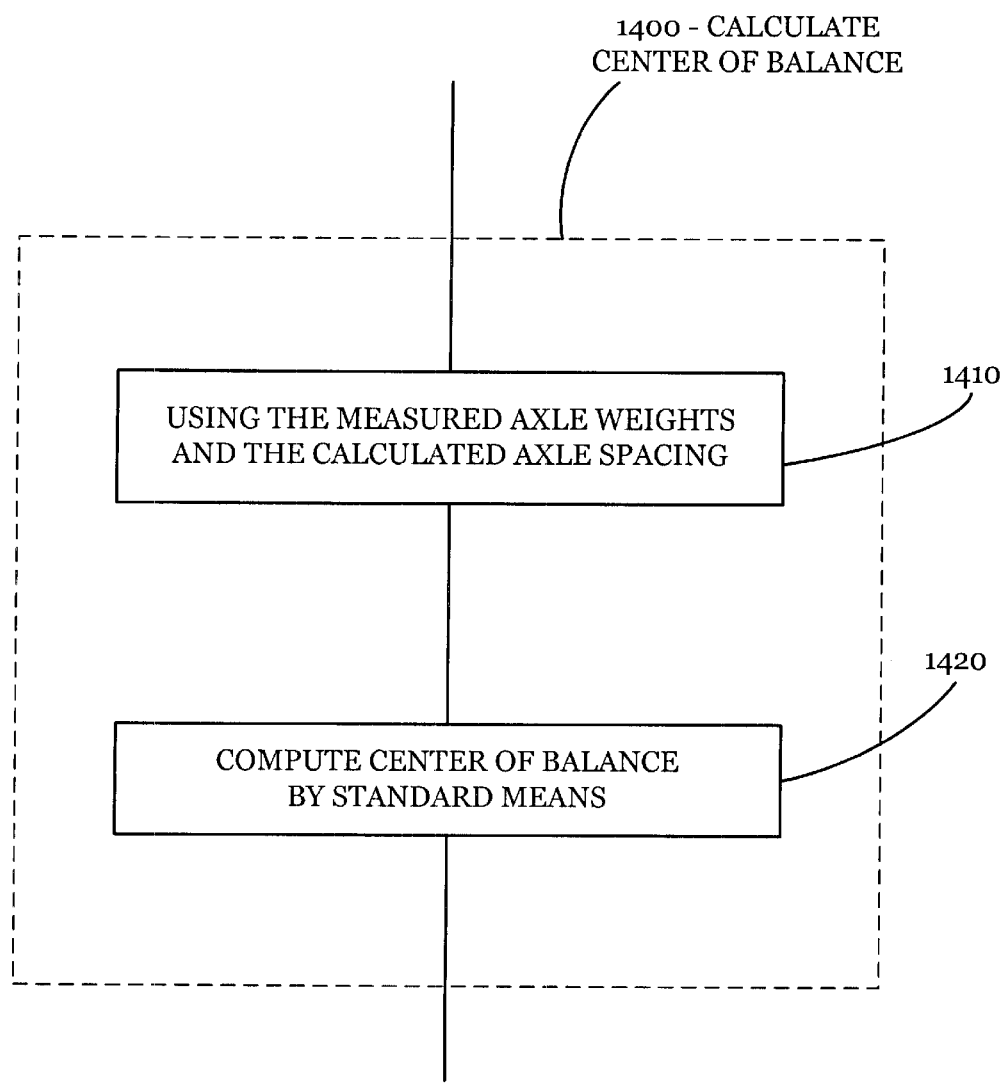
FIG. 20 is a flow chart 1400 showing substeps of step 1400 in FIG. 14.
Figure 21:
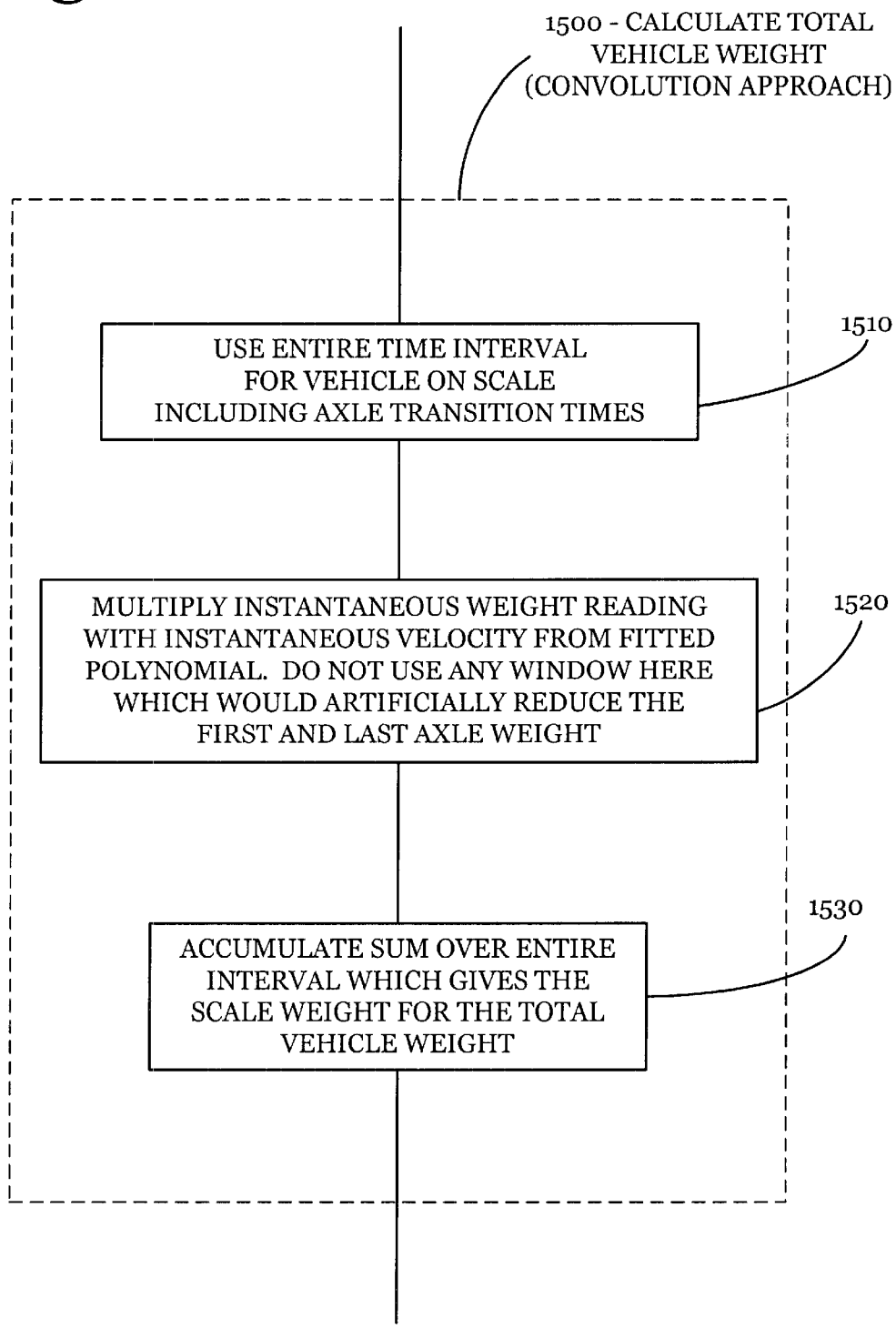
FIG. 21 is a flow chart 1500 showing substeps 1500 of step 1500 in FIG. 14.
Figure 22:
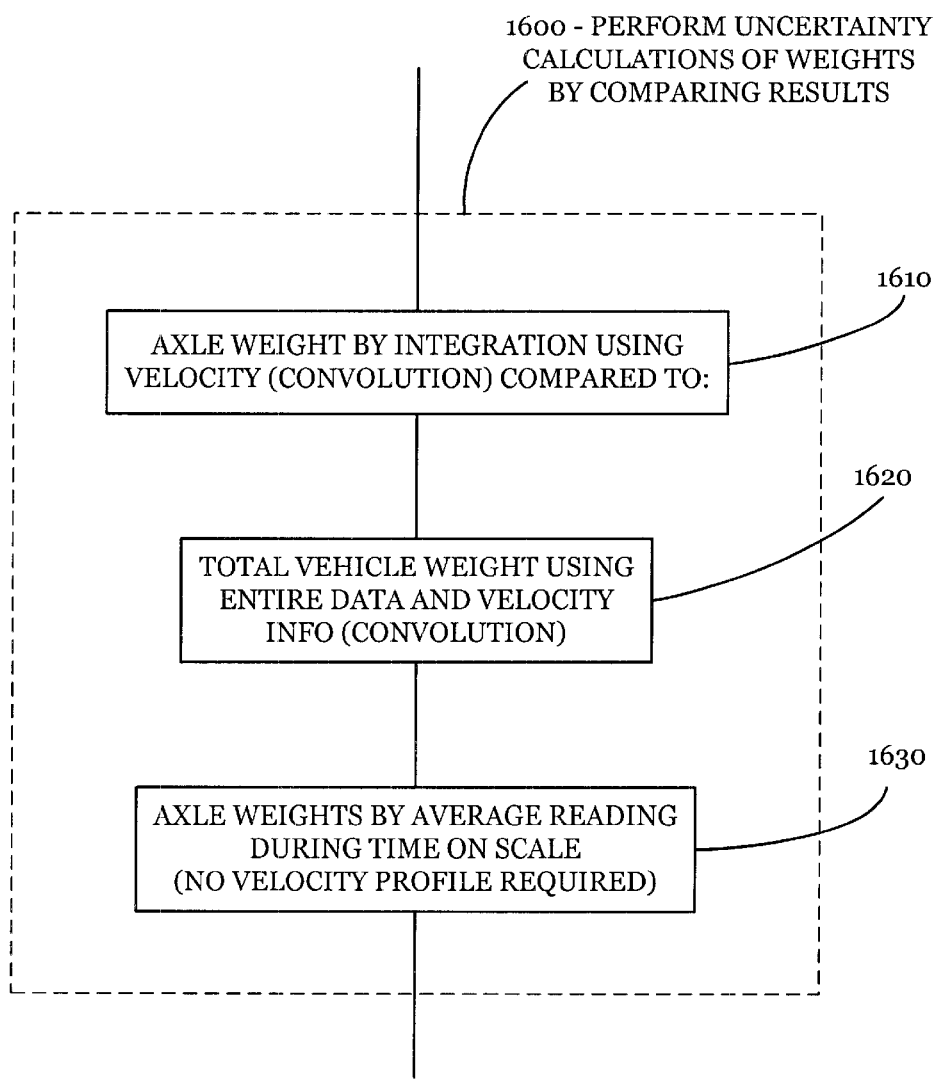
FIG. 22 is a flow chart 1600 showing substeps of step 1600 in FIG. 14.

The tire loading has some weight distribution $T(x)$ (See FIG. 9 where x is in the direction of travel. Reference is now generally made to FIGS. 10 and 11. FIG. 10 has a flat $S(x)$=constant over the sensor area and zero else where. FIG. 11 has a $S(x)$ which varies over the length of the scale, even going negative on the leading and trailing edges which are outside of the cantilever supports. Note: (x) means the function is recorded over distance and (t) the function is recorded over time. The load sensor has some response $S(x)$ (See FIG. 10) over its surface which in this case is uniform over the distance of the scale and zero elsewhere. As the tire rolls over the sensor the resultant waveform produced as the output of the scale is $W(t)$ where the data is collected over time t.

Now the vehicle is traveling at some speed $V(t)$ which is measured as a function of time. Therefore one needs to convert this data to a function of distance to match the other two functions $T(x)$ and $S(x)$. This is easily accomplished by multiplying $W(t) \times V(t)$ to yield $W(x)$ since $V(t)=dx(t)/dt$.

The relationships between all of these functions is the convolution $$W(t)V(t)=W(x)=T(x)*S(x)=\int T(z-x)S(z)dz.$$

Where the '*' is defined as the convolution operator. $W(t)$ represents the logged array of instantaneous weights which are logged at specific time intervals and at this stage of the game have an unknown correlation with the vehicles position. One needs to get the instantaneous velocity to convert these numbers to relate to the vehicles position on the scale.

Since convolution is a linear operator, the integral of the resultant waveform is simply the product of the two individual waveforms which make it up.

$$\int W(t)V(t)dt = \int W(x)dx = \int T(x)dx \int S(x)dx$$

With the transducer sensitivity being fixed with time, its integral is also fixed with time and can be included into a calibration constant.

$$1/K = \int S(x)dx.$$

Now the integral of the tire distribution is simply the total weight of the tire $$W_t = \int T(x)dx.$$

Therefore one can determine the total weight of the tire ($W_t$) from the data by integrating over time the product of the sensor output and the speed of the tire. This result is directly proportional to the weight of the tire by the calibration constant K. The sensitivity coefficient of the weight transducer (K) is then determined via calibration.

$$W_t = K\int W(t)V(t)dt.$$

Now in the earlier patent $V(t)$ was assumed to be constant $[V(t)=v]$ and it could then be factored out of the above equation to yield $$W_t = Kv\int W(t)dt = Kv\Sigma w_t.$$

Where $w_t$ are the points in time collected from the weight sensor as the vehicle rolled over it.

In this application one cannot factor the $V(t)$ to in front of the integral because it is definitely not a constant and must be kept inside the integral resulting in $$W_t = K\int W(t)V(t)dt = \Sigma w_i v_i$$

where $w_i$ are the scale readings over time and $v_i$ are the velocity data at the time of each corresponding $w_i$. This implies that the weight data $w_I$ must be stored until the velocity data $v_i$ can be determined by hindsight (least squares fitting) before the summation can be carried out.

In other procedures the weight readings $w_I$ may be summed on the fly as they were generated and did not need to be stored independently before summation. In practice here the weight readings can be summed over small intervals where the speed is not changing significantly to reduce the overall volume of data needed to be stored. With a data acquisition system collecting 5000 samples per second and the speed of a vehicle changing less than 10%/sec, and for velocities to better than 0.1% variation over the interval this reduces to 10 ms sample intervals. This means that one could sum 50 data points as a cluster and reduce the weight data by a factor of 50 without any significant loss of accuracy.

It would also be a simple matter to make this scale operate in either direction of travel. Since the data is stored and calculated immediately after the fact it would be a simple matter to invert the data for reverse travel. It would be obvious from the switch data what the direction of travel was.

The Load Sensors

Most pneumatic tires rest on the supporting surface in a pattern that is mostly elliptical. In cases where there is a large deep tread then the overall outline is basically elliptical. The profile can be integrated from left to right to give a pressure distribution in the direction of travel as shown in FIG. 9.

There are several basic types of load sensors used in flat scales for WIM systems. One is a piezoelectric load sensor which supports the plate at strategic locations and yield the same response to weight being placed anywhere on the sensor surface. A second is a hydraulic system that also produced the same flat response as FIG. 10.

A third type, shown in FIG. 11 is a bending plate which uses strain gauges. The bending plates according to one embodiment of our tests have knife edge supports along the leading and trailing edges about 2" in from each edge. The gauges are positioned along the sensor from left to right in two rows. Each row is positioned about one third of the sensor length in from each edge (leading and trailing). This produces the characteristic curve shown in FIG. 11. With this type of scale the sensitivity is not uniform over the scale from front to back but is uniform from left to right. This second characteristic is a preferred ingredient with the present invention. Of course the other two scales also meet this criteria and can be used with the present invention.

Initial Setup of the System

As shown in FIG. 1, a weight sensor and a pair of sensors were used in one configuration. However, it is not necessary that the placement be at the very beginning and at the end.

When a vehicle passes over the scale, it causes two types of signals, weight signals (1 per scale), as well as switching signals. An illustration of such signals are set forth in FIG. 13. These signals are stored separately for each vehicle.

Loops or other overhead body presence means could be used to detect vehicles to determine if there is a body above, to determine if the vehicle has completely passed over the scale. In some cases, to expedite processing of data, an operator input can be accepted to let the processor know when the last wheel has passed, in order that the data set may recognized as complete.

It should be understood that the signals which are generated from the weight scales are the same as the signals which were generated in a static scale environment.

Note that in one embodiment, the sensors can be placed at the leading and trailing edge of the scale, but the calculations do not require that.

In this most basic version the switch data and the weight data is all that is provided to the processor.

Buffering of Information

When the switches are placed on the scale, it is possible for the tires to contact the weight sensors prior to the time the switch is triggered. Therefore it is necessary to buffer an appropriate amount of weight data, as an example a 1–3 second time period, so that when a switch signal is received the buffered "pre-trigger" weight data can be utilized along with post-trigger weight data.

Processing of Data

Once the above weight and switch data is known, such data is processed, in a type of hindsight manner. Such processing is now discussed.

Getting the Axle Times

As the tire rolls over each switch it turns the switch on as it rolls on the switch and it turns the switch off as it rolls off the switch. The average of these two times is taken to determine the "axle times", being the time the axle is over the switch. This is done because different tires have different treads, can have different inflations, and can have different foot prints, so just taking the on or off time may not reflect the actual axle spacing. The midpoint in time is a fairly accurate representation of the axle position.

For purposes of further discussion, these axle times may be referenced further herein as "switch points", being instantaneous time values. A five axle 18 wheeler gives 5 switch points for each switch as it rolls across.

It will be seen that the present invention determines, solely from switch data, two valuable results, the instantaneous velocity of the vehicle at any time during which it is passing over the scale, and the axle spacing of the axles passing over the scales.

Checking for Complete Set of Switch Points

Once the switch points are known, the processor looks to see if all switches have the same number of switch points. If so, it then lines up the switch points to see if they make sense, by comparing (against a suitable threshold) the relative time differences among the set of first switch points to the same relative time differences among the set of second switch points, and so on through any additional switches. If they do line up, the processor assumes that the switch points correspond in order to sequential axles. In other words, if the leading switch includes five switch points and the trailing switch includes five switch points, these five switch points are associated in order with the five axles of the vehicle. This corresponds with the five axle 18 wheeler noted above.

If one of the switches fails to operate due to an unusual tread pattern or for some other reason, then one or more of the switch points can be missing. In this case the remaining switch points are arranged in a way that makes them the most consistent with each other and the missing points are identified and labeled as missing. If there are enough points available then processing proceeds as usual without the missed switch points.

Determination of Initial Instantaneous Velocity Points for Each Axle

As noted elsewhere in this application, knowledge of the velocity curve of the vehicle is desirable in order to provide more accurate calculations. In order to determine the velocity curve, some instantaneous velocity points must be determined.

Using switch times corresponding to the leading and the trailing axles and by knowing the switch spacing, the average velocity of each axle as it passes between the switches is readily determined. Once known, the average velocity of the leading axle is assumed to be the instantaneous velocity of the leading axle at the midpoint in time between the two leading axle switch times. The average velocity of the trailing axle is assumed to be the instantaneous velocity of the trailing axle at the midpoint in time between the two trailing axle switch times. This will give two different instantaneous velocity values for the vehicle at two different times. It should be understood that these values are preliminary, and may not be the final instantaneous velocity values; in practice this is just the first guess to refine the polynomial speed profile such that the actual switch midpoints correlate the best way possible with the profile determined.

It should be understood that these two instantaneous velocity values are rarely identical, as a driver is typically accelerating or decelerating at some point between the switches. If the driver is always accelerating, the instantaneous velocity of the leading axle is less than the instantaneous velocity of the trailing axle. Conversely, if the driver is always decelerating, the instantaneous velocity of the leading axle is greater than the instantaneous velocity of the trailing axle. In other words, the last axle occurs later in time so if accelerating then it will be going faster when it crosses the switches.

For a two switch, two axle situation, a straight line velocity curve must be provided, which means constant acceleration must be assumed, which may not be completely accurate. However, if more than two switches exist or if the vehicle has more than two axles, much more information can be obtained. For example, with two switches and five axles, 10 data points are available. With the 10 data points and knowing the distance between the two switches, the processor can not only get a pretty good estimate of the momentary speed at any time but also the acceleration. From that it can better determine the axle spacing, and better calculate the weight values as noted below.

So from the above it may be noted that the amount of information one has, how many wheels, how many switches, will put a limit on how high can estimate the variable factors such as velocity.

Completion of Velocity Curve

As noted above, the above isolated instantaneous velocity values are preliminary. However, they are necessary to proceed to the next step of processing the switch data, that is, to determine the final velocity profile.

With 3 axles and two switches, there are three combinations of two axles from which to determine speed. In this case two different approaches are used to determine two different velocity profiles. The first approach is to assume constant acceleration and use least squares analysis to draw a straight line velocity profile. Such analysis is illustrated by line 2301 in FIG. 23, in which least squares analysis concedes that nothing will fit exactly, as there is some redundant data in there which may have noise and or other errors present. If one data point says indicates that the vehicle is going faster than at another point, then a least squares compromise between the data points is used to minimize all the errors.

The second approach is to assume the data is exactly correct to use a second order polynomial for the velocity profile which passes exactly through the three instantaneous velocity values as shown by line 2302 in FIG. 23.

These two different velocity profiles 2301 and 2302 are then reviewed. If the second order polynomial velocity profile is relatively smooth (no large excursions), then the second order polynomial velocity profile is presumed to be accurate and is used as the final velocity profile. If the second order polynomial velocity profile is not relatively smooth, then the straight line least squares velocity profile is used.

With higher numbers of switch points, a higher order polynomial may be selected, which means one can assume the acceleration is changing but at a uniform rate. It should be noted that the inventors have used up to a 4-th order polynomial with lots of switches and axles but one has to look at all the polynomials from the straight line up to the highest order one has information for (but not past the 4-th) and then choose the one that is most "reasonable" in a statistical sense.

Determination of Axle Spacing; Further Discussion of Variables

Now that the processor has established the velocity curve, it can look that the times of the switches and readily calculate the axle spacing.

The velocity profile allows an estimation of the velocity at times other than can be measured. Using the switch times and the generated velocity profile which spans the switch time, axle spacing is readily determined. When put in the form of a polynomial then this estimation of speed is smooth between the known points and because it is known the vehicle has a lot of inertia this is a good assumption. Extrapolation of the speed beyond the measured points where polynomials are not good is not attempted but this is not necessary here anyway.

It may be understood that the least squares-approach is used when one has additional data that is redundant.

If one only has so many switch points and so many switches, then that limits the number of variables one can estimate—the order of the polynomial. The higher orders of polynomials provide for more variability in speed to be accounted for. In other words, the number of variables vary depending on the number of axles and the number of switches involved.

Therefore it may be seen that the switch data alone has been used to determine instantaneous velocity and axle spacing. This is advantageous in that the weight data can be misleading since one axle may be entering the scale at exactly the same time another is leaving i.e. the scale is the same length as the axle spacing.

Approximating Integration of Weight and Velocity Data

Therefore it may be understood that two important values are known: the velocity profile, and the axle spacing from the switch information alone. Once the axle spacing and the velocity profile are known, a determination can be made of which axles are on the scale at any point in time. This is extremely valuable as the scale results can be misleading, because wheels can be going on and off synchronously. For example, in some situations the spacing of the axles from the front axle of the cab to the third set of axles can be the same as the length of the scale, which means the leading axle can go off at the same time the third axle was coming on the weight sensor.

This velocity profile is the velocity of the vehicle at any point in time. Combining the velocity profile with the weight data as described earlier using the convolution integration one can determine the average weight of an axle on the scale.

Such summation/integration can be done by individual axle, or can be done for the whole vehicle.

It should be understood that reference is made to the use of integration throughout this discussion. In a pure mathematical sense one integrates over a continuous line of the weight data. In practice one must take points in time knowing that if they are close enough together then one can assume that the change that is going on between them is indeed a smooth straight line which is a very good approximation. Therefore in practice one has an array of numbers spaced in time and one approximates the integration with a summation of these numbers. in the discrete time domain that one is measuring the data. For purposes of this application such actual calculations will be understood as "approximating" integration, or "simulating" integration. This is all known and understood by one skilled in the state of the art of such processing.

Determination of Individual Axle Weights by Convolution

If the individual axle weights are desired, it is necessary to utilize axle spacing.

Time slices are taken for various weight scale loadings, the time slices are integrated after they are multiplied by the velocity. Again the convolution is in operation here.

By knowing the axle spacing and the velocity profile, the processor can determine what axle(s) are on the weight scale at what time. The processor then determines a number of different time "slices", during which the axles on the scale are not changing (entering or leaving). It may be understood that some time slices will have one axle only, and some will have multiple axles.

For a given two axles and a given two switches, there are three possible time slices. The first time slice is for the time the leading tire is the only tire on the scale. The last time slice is for the last tire is the only tire on the scale. It may be possible to have an intermediate time slice during which both tires are on the scale, when the scale is longer than the axle spacing.

In some cases one may have 3 or more axles on the scale at one time for long scales and this process is just expanded to handle all the combinations that can happen. This may require some additional book keeping in the computer code but is well known in the state of code programming.

Each of these time slices is used to perform the weight-velocity product integration technique defined above, to provide a weight measurement of the axle(s) on the scale for that particular time slice.

If there are three time slices for two axles, it may be understood that three different measurements are provided for two different quantities, which provides redundant data. Due to typical errors, this will result in the sum of the two isolated axle weights to be different from the two combined axle weights. Thus least squares fitting is utilized again to provide a best guess to provide individual axle weights which will satisfy least squares analysis.

In the individual axle approach, it is desired to only take the data when the tire is fully on the scale. Therefore the time slices are not necessarily the entire time period which the tire is on the scale—slope up and slope down of transition portions may be clipped off to leave out parts where the tire may be only partially on the scale.

Determination of Overall Vehicle Weight by Convolution

It may be noted that whole vehicle weighing only does not need axle spacing, but does need the velocity profile.

If doing the overall vehicle convolution approach, the processor need only to integrate from the very first piece of data to the last piece of data after multiplying by the instantaneous speed—like integrating one whole tire.

Comparison

Obviously, the total vehicle weight is sum of the axle weights. If individual axle weights and total vehicle weights are calculated as described above, this allows for comparison between two overall weights.

There is a reason to calculate the whole vehicle as a unit with the convolution approach and also the axle weights by the convolution approach. When calculating the axle weights one calculates little pieces of the data, and the transition pieces may be left out to get the best section for the convolution desired for one tire. When the entire waveform is integrated to get a total vehicle weight, nothing is left out and this therefore provides a good cross check.

Determination of Average Scale Reading

In some instances, it is necessary to average the scale reading over a specific time interval during which no additional tires/axles are entering or leaving the transducer. The resultant average weight value closely matches the static weight of the associated axles on the transducer. Accordingly, this value can be used as a real-time cross-checking reference of our approximated integration algorithm to reveal any subsequent need for system recalibration or adjustment.

Determination of Center of Balance

Center of balance is the distance of the center of gravity along the length of the vehicle. Determination of the center of balance of the vehicle is readily done if individual axle weights and spacings are known. Center of balance is useful for the military.

Alternatives

If one uses an external velocity determination (e.g. Doppler) at least one switch would still be needed to provide a reliable axle count. The more accurate velocity profile obtained this way could be used directly in the convolution process without having to generate a polynomial velocity profile. The switch data could be an optical sensor close to the ground, or some sonar sensor which detects tires or even a TV camera with object recognition. One could indeed get away with one "switch" if another means for measuring the velocity is used, such as by sensor 141 in FIG. 8. If sensor 141 can also determine distance, switch sensor may be eliminated or duplicated.

Various Uses of the Various Data Obtained

Highway applications such as highway weighing stations are interested in axle weights. Some application (e.g., the military) may only care about the center of balance and the total weight.

The Scales

If using the integration approach, either FIG. 10 or 11 can be used.

The data discussed herein a FIG. 10 scale was used, although a FIG. 11 scale could be used.

Calculating the static weight is not possible with a FIG. 11 type scale, but FIG. 11 scales are widely used for weigh in motion scales, just not for static scales because they don't work for static readings.

The Flow Charts

A series of flow charts are set forth as FIGS. 14–22. These flow charts may also be referenced in further understanding the operation of the present invention beyond that described above.

Additional Processing for Improved Accuracy

Since the present invention deals with long static scales, the vehicles natural oscillations near 3 Hz will have many cycles during the time on the scale. This is apparent when looking closely at FIG. 3 or by converting the same signal into the frequency domain. Since the data are collected as a function of time it would be a simple matter of putting a digital notch filter around this frequency and/or combine with certain digital windows. This will minimize the aliasing of not having whole vehicle bounce cycles to integrate over.

Possible Sources of Error

With this integration technique and the large number of data points (100,000 typically) AC noise is virtually eliminated. The major source of error in this system is not in the measuring system at all but in the dynamic motion of the vehicle being weighed. Most truck suspensions are tuned to the neighborhood of 3 Hz. If a vehicle is traveling at 5 mph then every 30 inches of travel the tire weight shifts from a maximum to a minimum back to a maximum.

Sensors mounted on a truck carriage indicated that small bumps can create as much as a 0.2 g acceleration in the vertical direction. If the truck carriage is 10% of the total weight then one has a 2% potential weight variation just due to a misplaced bump in the road. A small trailer being towed by a standard ball hitch produced highly erratic waveforms from the sensor. Fortunately the integration technique, the digital notch filter, and the proper digital window, coupled with the long static scale platform minimizes this effect.

Also many situations will call for the vehicle to accelerate (or decelerate) just before entering the scale. This frequently excites a significant vertical bounce to the cab of a tractor trailer which can take a while to settle out.

In our favor most heavy vehicles have a fair number of axles and the errors tend to average out. Only in cases where the wheel spacing nearly match scale lengths, irregularities in the pavement approaching and exiting, and speed all happen to align with each other does this be a significant issue. However, such cases are exceptional and do not detract from the invention.

Actual Results of Calculations

Referring now to FIG. 1, the static scales consist of three sections used to weigh individual axle sets on the motor vehicle carrier. Scale A is a forty foot long section used to weigh the trailing axle(s), scale B is a 14 foot long section used to weigh the back tractor axle(s) and the scale C is a 14 foot long section used to weigh the front axle. It may be understood that such configurations are conventional in the static scale art.

However, in the conversion of a conventional static scale configuration, scale B was modified by adding two conventional tape switches on the leading and trailing edges of the scale to provide an accurate speed and determine the number of axles on the scale at any given time. The tape switches provided a simple on/off indication of when the tire was present on the switch. Means were provided to tie into the direct output signal from the static transducer load cells. A simple breadboard circuit was provided to condition these signals and feed them into an 8-bit oscilloscope for recording and post-analysis of the signals.

Figure 2:
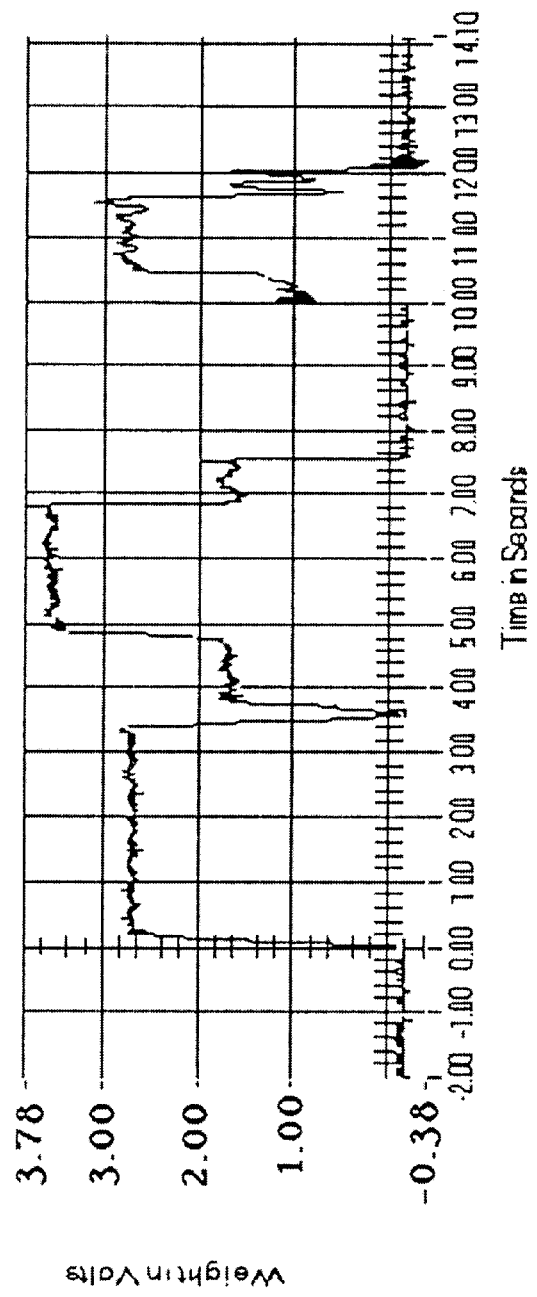
FIG. 2 shows a typical output signal waveform chart 2000 for an eighteen wheeler tractor-trailer as it passes across a scale such as used in static weighing.
Figure 3:
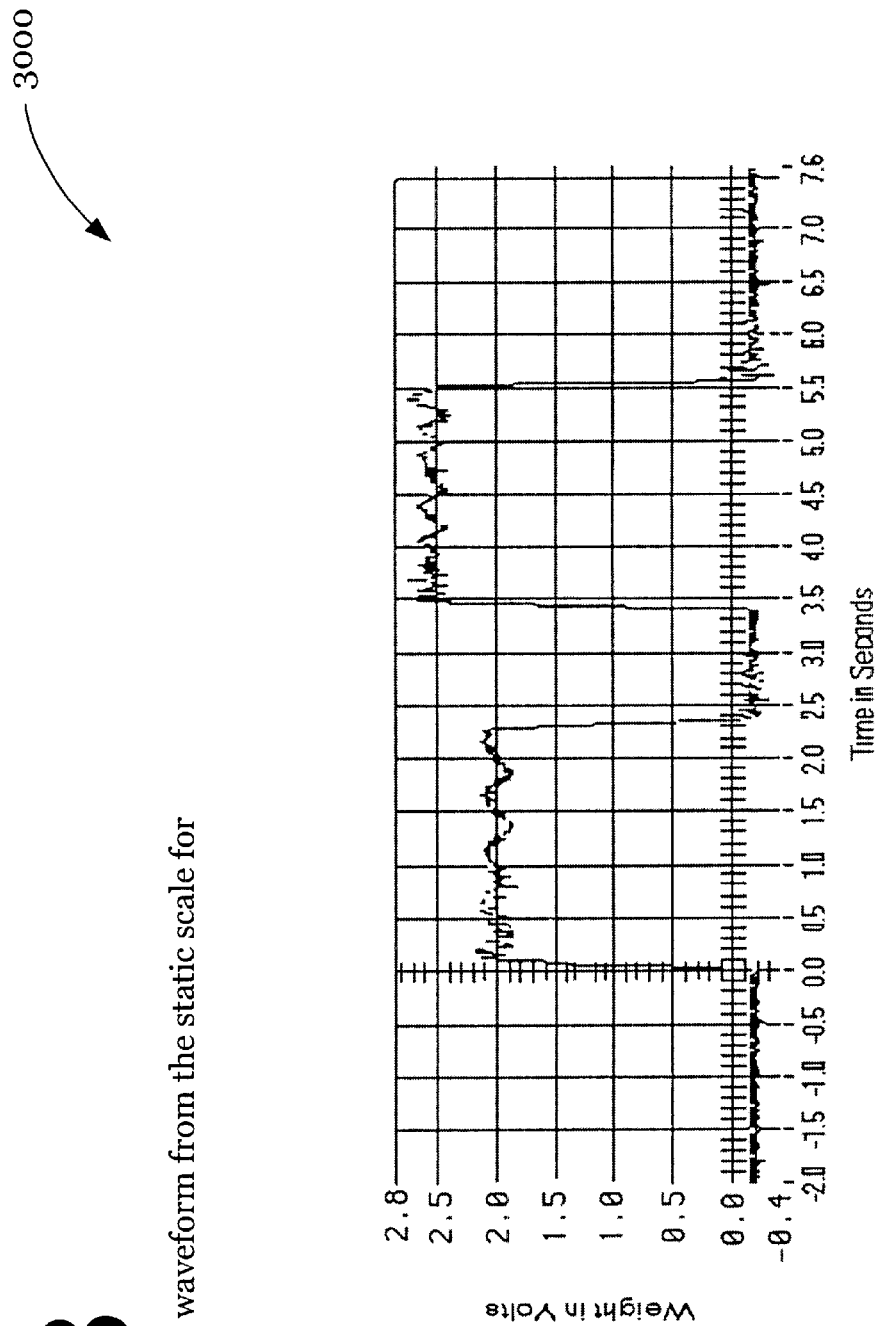
FIG. 3 shows a typical output signal waveform chart 3000 for a dual axle vehicle.

Each vehicle was weighed statically in the traditional manner where the truck would pull up onto the scale and the front tractor axle was weighed on scale C. The second tractor axle or set of tandem axles were weighed on scale B and the third trailer axle or set of tandem axles were weighed on scale A. The driver was then asked to back up to a point were the tractor and trailer was entirely off the scales and then drive over the scales at a constant rate of approximately 10 mph. As the vehicle passed over scale B the output signal from scale B as well as the reference signals from the two switches were recorded on the 8-bit oscilloscope. FIG. 2 shows a typical output signal waveform for an eighteen wheeler tractor-trailer. FIG. 3 shows a typical output signal waveform for a dual axle vehicle.

The results of these tests are summarized in Table I (FIG. 24) on a per axle set basis. Table II (FIG. 25) summarizes the test results on a total vehicle weight basis. Note that for several of the vehicles weights were not obtained for the middle and trailing axle(s). This was due to a limitation in the simple breadboard circuit to condition these signals and feed them to the oscilloscope for recording and therefore rendered that data invalid. Several of the heavier vehicles caused the circuit to be saturated.

Figure 4:
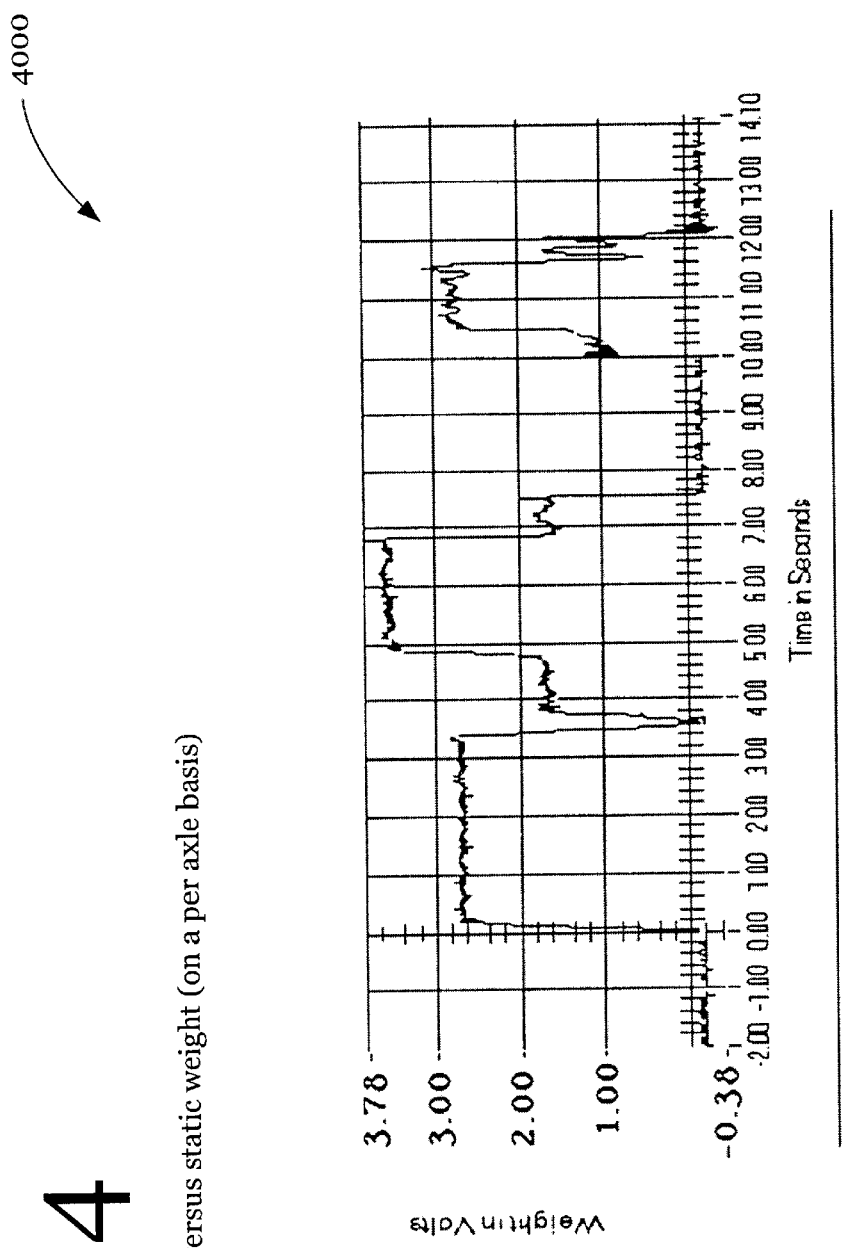
FIG. 4 is a plot chart 4000 of the data from Table I (FIG. 24) showing the absolute error verses the static weight for 28 axle sets evaluated.
Figure 5:
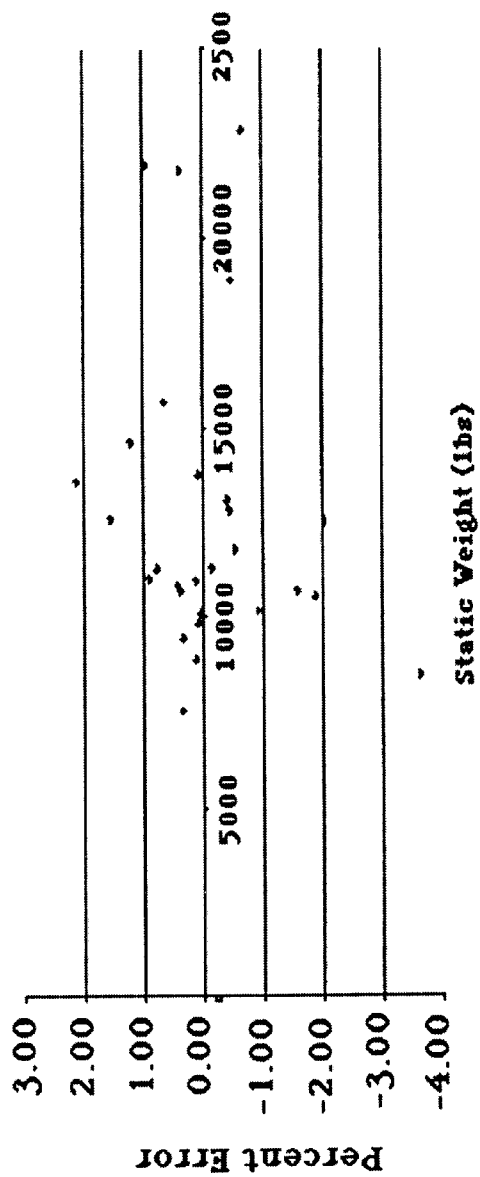
FIG. 5 is a plot chart 5000 of the percent error versus the static weight for the 28 axle set.

FIG. 4 is a plot of the data from Table I (FIG. 24) showing the absolute error verses the static weight for 28 axle sets evaluated. FIG. 5 is a plot of the percent error versus the static weight for the 28 axle set. One can see from the data plots that there is no bias due to the absolute weight of the vehicle and that all the variations appear to be random.

Figure 6:
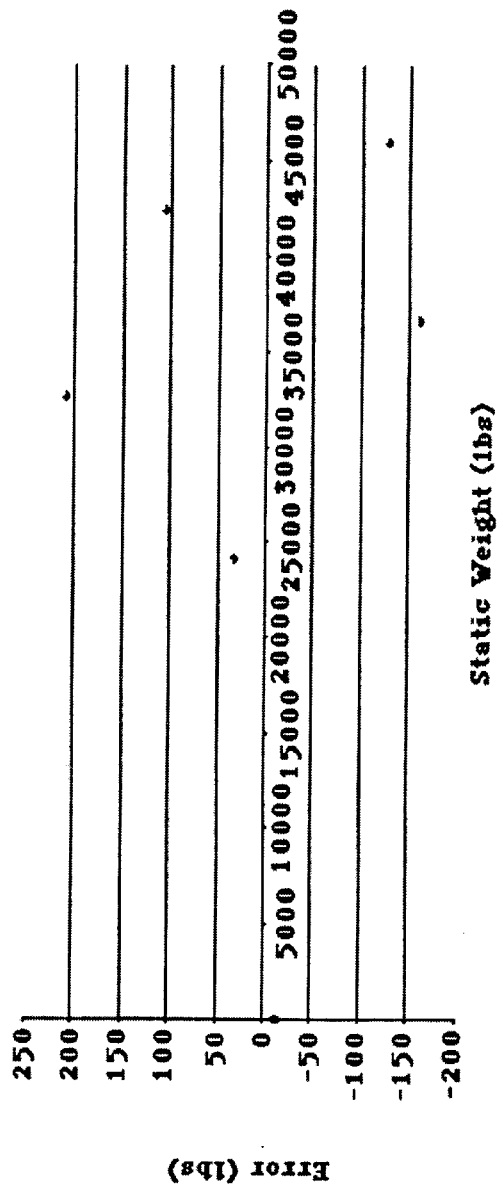
FIG. 6 is a plot chart 6000 of the data from Table II (FIG. 25) showing the absolute error verses the static weight for the six vehicle data set.

FIG. 6 is a plot of the data from Table II (FIG. 25) showing the absolute error verses the static weight for the six vehicle data set.

Figure 7:
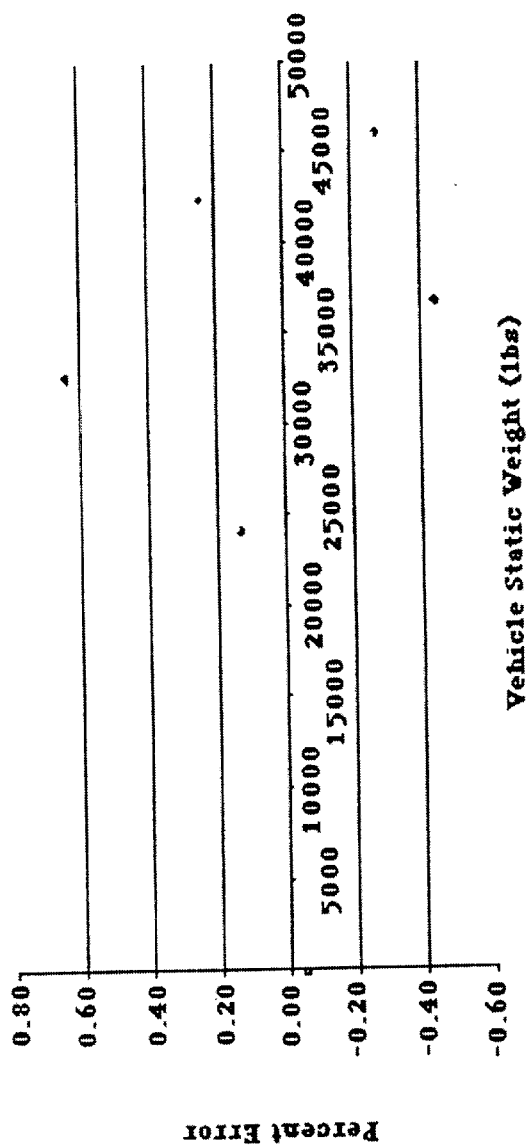
FIG. 7 is a plot chart 7000 of the percent error versus the static weight for the six vehicle data set.

FIG. 7 is a plot of the percent error versus the static weight for the six vehicle data set.

The weight-determining algorithm discussed elsewhere in this application was used to analyze the raw data and determine both the individual axle set weight, as well as the overall vehicle weight. For the analysis herein, an axle set is defined as either a single axle or a set of tandem axles, which would normally be weighed as a group on the static scale. (Example: the rear tandem axles on the tractor were weighed as an axle set as was the tandem on the trailer.)

By calculating the standard deviation for a six (6) vehicle test runs shown in Table II (FIG. 25) and using the Student's t-distribution (the standard published mathematical table for estimating statistical errors), one can estimate the accuracy of the WIM system to be 1.0% with a 95% confidence interval on a per vehicle basis. Considering the data collected in Table I (FIG. 24) on a per axle set basis and again calculating the standard deviation and then applying the Student's t-distribution one estimates the WIM system accuracy to be 2.5% with a 95% confidence interval. The fact that the accuracy on a per vehicle basis is better than on a per axle set basis is due to the fact the individual errors per axle tend to cancel resulting in an increased accuracy on the overall vehicle weight. The weight-determining algorithm takes advantage of this fact by first determining the individual axle weights and then summing them to determine the overall vehicle weight. The individual errors when averaged together result in an increased accuracy for the total vehicle weight.

Figure 8:
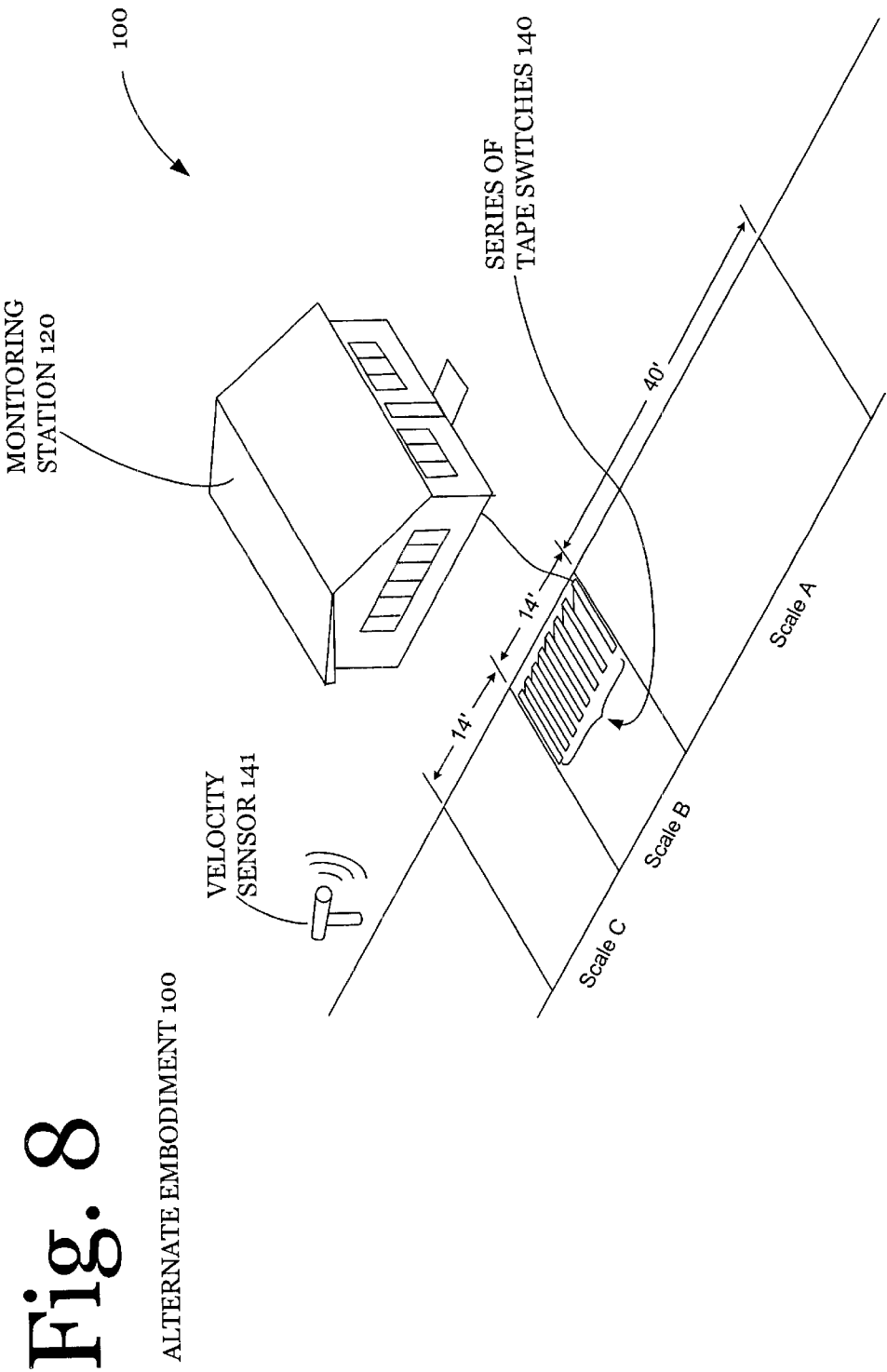
FIG. 8 is a pictorial view of a second WIM apparatus 100 according to the present invention, which includes a monitoring station 120, a weighing lane 130, and a series of tape switches 140 in the weighing lane 130. In the configuration shown there are eight (8) switches shown, but more or less may be provided without departing from the spirit and scope of the present invention. Additionally, a vehicle velocity or speed sensor 141 is shown which can be used to determine vehicle velocity and/or location over time, independently or in conjunction with the switches 140.

These results are extremely encouraging and indicate the potential that a static scale can be converted to a high-accuracy, low-speed WIM system with accuracy comparable to the scale used in the static mode. This assumes that, unlike the initial experiment, all three scales (A, B, and C) are instrumental simultaneously and results averaged. If all three scales are used in this approach then the number of determinations will reduce the statistical error by almost half. By incorporating additional hardware and associated process that a static scale converted WIM system can be used to make measurements on both the axle set and vehicle basis with an accuracy better than 1%. The additional hardware would include additional switches mounted along the length of the scale, or some other form of speed versus time sensor(s) such as radar or other means known in the art, and additional data acquisition processing. The additional switches would allow for a more accurate measure of the velocity, which would be used to improve the weight determining algorithm. FIG. 8 shows how the physical layout of a one such converted static scale would appear. Sensor 141 could also be used to determine velocity and location of the vehicle.

Mainline Applications

It should be understood that the invention should not be considered as limited to use in a weigh station, which is used for diverted traffic from mainline traffic flow. Instead the weigh station invention should be understood as capable of being used within mainline traffic flow, either within a typical highway application or within a bridge construction. Preferably when used in the bridge construction the weigh station could be built in at the time of bridge construction, or at least the bridge could be built to accommodate subsequent weigh station installation in mind.

It should be understood that such mainline applications could be use for mainline weight enforcement, as opposed to simple screening. Such an invention could be used for "on-the-fly" enforcement (ticketing) in conjunction with video cameras, license plate readers, etc. Other forms of velocity measurement could also be used, such as the standard loops now incorporated at traffic lights. Vehicle profilometry could also be used so as to classify vehicles based on their aerodynamic lift and subsequently improve accuracy.

Other Options and Alternatives

Other options are any place where the weight of a vehicle is of concern such as military bases for loading air transport, railways for cargo trailers on flat beds, entrances to bridges with tight load limits, etc. General weighing may also be done at locations such as landfills, produce and farm processing facilities, etc.

CONCLUSION

While this invention has been described in specific detail with reference to the disclosed embodiments, it will be understood that many variations and modifications may be effected within the spirit and scope of the invention as described in the appended claims.

We claim:

1. A method for determining the total weight of a vehicle moving atop a weight scale comprising the steps of:
   A) providing a weight scale of sufficient length that multiple axle sets of a vehicle can be located on said scale simultaneously;
   B) determining at a predetermined data rate the velocity of said vehicle at a plurality of discrete points in time beginning at the point in time when a first tire of said vehicle enters said scale until a point in time when a last tire of said vehicle exits said scale;
   C) sensing and recording the position of said axle sets at a plurality of locations on said weight sensor within the period of time that said vehicle is on said scale;
   D) determining the instantaneous weight of said vehicle at each of said plurality of discrete points in time;
   E) summing the products of the determined velocity and the determined instantaneous weight at each of said plurality of discrete points in time;
   F) normalizing by dividing the result of the preceding step by said predetermined data rate; and
   G) multiplying the result obtained in the preceding step by a calibration constant to determine vehicle weight.

2. The method for determining the total weight of a vehicle as claimed in claim 1, wherein said variable velocity profile is determined from vehicle position sensor information.

3. The method for determining the total weight of a vehicle as claimed in claim 1, wherein said variable velocity profile is determined from tire presence information.

4. The method for determining the total weight of a vehicle as claimed in claim 1, wherein said variable velocity profile is determined from vehicle location information.

5. The method for determining the total weight of a vehicle as claimed in claim 1, wherein said variable velocity profile is determined from a continuous sensing of the speed of the vehicle.

6. A method for determining the weight of a vehicle axle moving atop a weight scale comprising the steps of:
   A) providing a weight scale of sufficient length that multiple axle sets of a vehicle can be located on said scale simultaneously;
   B) determining at a predetermined data rate the velocity of said vehicle at a plurality of discrete points in time beginning at the point in time when a tire of an axle of said vehicle enters said scale until a point in time when said tire exits said scale;
   C) sensing and recording the position of each axle at a plurality of locations on said weight sensor within the period of time that said vehicle is on said scale;
   D) determining the instantaneous weight of the vehicle axles at each of said plurality of discrete points in time;
   E) summing the products of the determined velocity and the determined instantaneous weight at each of said plurality of discrete points in time;
   F) normalizing by dividing the result of the preceding step by said predetermined data rate; and
   G) multiplying the result obtained in the preceding step by a calibration constant to determine the weight of said vehicle axle.

7. The method for determining the weight of a vehicle axle as claimed in claim 6, wherein said variable velocity profile is determined from vehicle position sensor information.

8. The method for determining the weight of a vehicle axle as claimed in claim 6, wherein said variable velocity profile is determined from tire presence information.

9. The method for determining the weight of a vehicle axle as claimed in claim 6, wherein said variable velocity profile is determined from vehicle location information.

10. The method for determining the weight of a vehicle axle as claimed in claim 6, wherein said variable velocity profile is determined from a continuous sensing of the speed of the vehicle.

11. A method of weighing a vehicle having multiple adjacent axles moving atop a weight scale, comprising the steps of:
   passing more than one axle over said weight scale at a time such that multiple adjacent axles are on said scale for a period of time;
   determining at a predetermined data rate the velocity of said vehicle at a plurality of discrete points in time beginning at the point in time when a first tire of said vehicle enters said scale until a point in time when a last tire of said vehicle exits said scale;
   determining the instantaneous weight of said vehicle at each of said plurality of discrete points in time;
   summing the products of the determined velocity and the determined instantaneous weight at each of said plurality of discrete points in time;
   normalizing by dividing the result of the preceding step by said predetermined data rate; and
   multiplying the result obtained in the preceding step by a calibration constant to determine vehicle weight.

12. The method of weighing a vehicle as set forth in claim 11, wherein said multiple adjacent axles are two adjacent axles.

13. The method of weighing a vehicle as set forth in claim 12, wherein said multiple adjacent axles are three adjacent axles.

14. A method of weighing a vehicle having at least two axles, comprising the steps of:
   passing a vehicle having at least two axle sets over a weight sensor of sufficient length to accommodate more than one axle set on said weight sensor at a time;
   sensing and recording the position of an axle at a plurality of locations on said weight sensor within a period of time;
   determining a velocity profile of said vehicle over said period of time by use of said plurality of sensed and recorded axle positions;
   determining axle spacing by use of said variable velocity profile and said sensed and recorded positions of said axle;
   sensing and recording an instantaneous weight profile of each axle set over said period of time by use of said weight sensor;
   using said axle spacing to determine a time segment within said period of time when only one of said axle sets is known to be on said scale;
   for said one axle, determining at a predetermined data rate the velocity of said vehicle at a plurality of discrete points in time during said time segment;
   determining the instantaneous weight of said axle set at each of said plurality of discrete points in time;
   summing the products of the determined velocity and the determined instantaneous weight at each of said plurality of discrete points in time;
   normalizing by dividing the result of the preceding step by said predetermined data rate;
   multiplying the result obtained in the preceding step by a calibration constant to determine the weight of said one axle set; and for each axle set comprising more than one axle, using redundant weight information of said axle set to calculate an optimum weight of the individual axles comprising said axle set using the least-squares method.

15. The method as claimed in claim 14, wherein a method of least squares analysis is used to determine said velocity profile based on average axle velocity values for each of said axles.

16. The method as claimed in claim 14, wherein a method of polynomial fitting analysis is used to determine said velocity profile based on average axle velocity values for each of said axles.

17. A method for retrofitting a static scale facility into a weigh-in-motion facility, said static scale facility prior to said conversion including a scale configured to provide a variable weight profile of weight versus time in response to a variable weight placed atop said scale over a period of time, said retrofitting process comprising the steps of:

locating a weight scale being along a vehicle path, said weight scale being of sufficient length to accommodate more than one axle set of a vehicle on said weight scale at a time, and said weight scale configured to provide weight scale data such as used in static scales;

placing a plurality of tire presence sensors in said vehicle path, said tire presence sensors configured to provide tire switch data; and installing a processor for evaluating said tire switch data and said static scale weight data and providing weight-in-motion calculations by performing the following steps:
1. determining the velocity of a vehicle at each of a plurality of discrete points in time;
2. determining the instantaneous weight of said vehicle at each of said plurality of discrete points in time;
3. summing the products of the determined velocity and the determined instantaneous weight at each of said plurality of discrete points in time;
4. normalizing by dividing the result of the preceding step by said predetermined data rate; and
5. multiplying the result obtained in the preceding step by a calibration constant to determine vehicle weight.

18. The method as claimed in claim 17, wherein said step of installing a processor includes the step of installing a processor which can determine instantaneous velocity values for the vehicle as it passes across said weight scale.

19. Apparatus for determining the weight of a moving vehicle comprising:

a) a scale having a length such that at least two axles of a multiple-axle vehicle can be received thereon at the same time, said scale generating an output corresponding to the weight of a load located thereon;
b) tire position determining means at various locations along the scale length, said tire position determining means generating switch transitions in response to determining the presence of a tire;
c) a means for digitizing said scale output as a function of time;
d) a means for recording said switch transitions as a function of time; and
e) a means for computing vehicle weight by performing the steps of:
1. determining the velocity of a vehicle at each of a plurality of discrete points in time;
2. determining the instantaneous weight of said vehicle at each of said plurality of discrete points in time;
3. summing the products of the determined velocity and the determined instantaneous weight at each of said plurality of discrete points in time;
4. normalizing by dividing the result of the preceding step by said predetermined data rate; and
5. multiplying the result obtained in the preceding step by a calibration constant to determine vehicle weight.

20. The apparatus of claim 19, additionally including means for computing axle spacing.

21. The apparatus of claim 19, additionally including means for computing center of balance.

22. The apparatus of claim 21, wherein the tire position determining means are switches located at the entrance and exit of the scale.

23. The apparatus of claim 21, wherein the tire position determining means are a plurality of switches located along the length of the scale.

24. The apparatus of claim 21, wherein the tire position determining means includes a position and speed sensor determining the location and speed of the vehicle.

25. The method of claim 1, wherein said step of determining the velocity of said vehicle at a plurality of discrete points comprises the step of least squares fitting.

26. The method of claim 25, comprising the further step of using said step of least squares fitting to determine axle spacing.

27. The method of claim 26, comprising the further step of using said axle spacing and said sensed weights to determine the center of gravity of said vehicle.

* * * * *